United States Patent
Nagase et al.

(10) Patent No.: US 8,237,689 B2
(45) Date of Patent: Aug. 7, 2012

(54) IMAGE ENCODING DEVICE, IMAGE PROCESSING DEVICE, IMAGE DISPLAY DEVICE, IMAGE ENCODING METHOD, AND IMAGE PROCESSING METHOD

(75) Inventors: Akihiro Nagase, Tokyo (JP); Jun Someya, Tokyo (JP); Noritaka Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1239 days.

(21) Appl. No.: 11/918,128

(22) PCT Filed: Oct. 18, 2006

(86) PCT No.: PCT/JP2006/320741
§ 371 (c)(1),
(2), (4) Date: Oct. 10, 2007

(87) PCT Pub. No.: WO2007/097067
PCT Pub. Date: Aug. 30, 2007

(65) Prior Publication Data
US 2009/0085896 A1 Apr. 2, 2009

(30) Foreign Application Priority Data

Feb. 24, 2006 (JP) ................. 2006-048180
Jul. 13, 2006 (JP) ................. 2006-192546

(51) Int. Cl.
*G06F 3/038* (2006.01)
(52) U.S. Cl. ........ 345/204; 345/690; 345/214; 382/162; 382/232; 382/251; 382/263; 382/272
(58) Field of Classification Search .......... 345/204–205, 345/690, 694, 698, 214, 55, 76–77, 87–90; 348/384.1, 405.1; 382/162–167, 232, 233, 382/251, 263, 272, 276
See application file for complete search history.

(56) References Cited

U.S. PATENT DOCUMENTS

| 5,166,987 | A | * | 11/1992 | Kageyama | .................... 382/250 |
| 5,241,381 | A | * | 8/1993 | Kondo | .................... 375/240.01 |
| 5,414,527 | A | | 5/1995 | Koshi et al. | |
| 5,440,344 | A | * | 8/1995 | Asamura et al. | ......... 375/240.04 |
| 6,058,217 | A | * | 5/2000 | Kondo | .................... 382/251 |
| 6,266,454 | B1 | * | 7/2001 | Kondo | .................... 382/300 |
| 6,381,369 | B1 | * | 4/2002 | Kondo | .................... 382/238 |
| 6,756,955 | B2 | * | 6/2004 | Someya et al. | .................... 345/88 |

(Continued)

FOREIGN PATENT DOCUMENTS

JP 62-266924 A 11/1987
(Continued)

*Primary Examiner* — Jason Mandeville
(74) *Attorney, Agent, or Firm* — Birch, Stewart, Kolasch & Birch, LLP

(57) ABSTRACT

An image encoding device includes a dynamic range generator for outputting dynamic range data Dd1 of block image data Dc1, an average value generator for outputting average value data De1 of the block image data Dc1, a number-of-pixel reducing unit 20 for decreasing number of pixels of the block image data by reduction-number of pixels to generate reduced-number-of-pixel block image data Dc1', an encoding parameter generator 18 for generating encoding parameter pa1 specifying a quantization bit rate and the reduction-number of pixels in accordance with the dynamic range data Dd1, a quantization threshold generator 19 for generating a quantization threshold value tb1, and an image data quantizer 21 for generating quantized image data Df1 from the reduced-number-of-pixel block image data Dc1' with use of the quantization threshold value tb1.

10 Claims, 21 Drawing Sheets

U.S. PATENT DOCUMENTS

| | | | |
|---|---|---|---|
| 6,898,319 B1 * | 5/2005 | Hazra et al. | 382/232 |
| 7,034,788 B2 | 4/2006 | Someya et al. | |
| 7,853,088 B2 * | 12/2010 | Sakazume et al. | 382/232 |
| 7,925,111 B2 * | 4/2011 | Someya et al. | 382/274 |
| 2003/0231158 A1 * | 12/2003 | Someya et al. | 345/101 |
| 2004/0160617 A1 | 8/2004 | Okuda et al. | |
| 2008/0019598 A1 * | 1/2008 | Someya et al. | 382/236 |
| 2008/0174612 A1 * | 7/2008 | Someya et al. | 345/690 |

FOREIGN PATENT DOCUMENTS

| | | | |
|---|---|---|---|
| JP | 62266923 A * | 11/1987 | |
| JP | 1-171324 A | 7/1989 | |
| JP | 5-56282 A | 3/1993 | |
| JP | 6-197229 A | 7/1994 | |
| JP | 7-307869 A | 11/1995 | |
| JP | 8-21865 B2 | 3/1996 | |
| JP | 2616652 B2 | 3/1997 | |
| JP | 9-148938 A | 6/1997 | |
| JP | 2004-163842 A | 6/2004 | |
| JP | 3673257 B2 | 4/2005 | |
| JP | 3694004 B2 | 7/2005 | |
| JP | 3703806 B2 | 7/2005 | |
| WO | PCT/JP2006/320741 | 10/2006 | |
| WO | WO 2007/097067 A1 | 8/2007 | |

* cited by examiner

IMAGE ENCODING DEVICE, IMAGE PROCESSING DEVICE, IMAGE DISPLAY DEVICE, IMAGE ENCODING METHOD, AND IMAGE PROCESSING METHOD

TECHNICAL FIELD

The present invention relates to an image encoding device, an image processing device including the image encoding device, an image display device including the image processing device, an image encoding method, and an image processing method, which are used for encoding input image data on a block-by-block basis.

BACKGROUND ART

Since a liquid crystal panel is thin in thickness and light in weight, it is widely used as a display device such as a television receiver set, a computer display, a display of a personal digital assistant or the like. However, since a liquid crystal requires a given time after a drive voltage is applied to the liquid crystal until transmissivity of the liquid crystal reaches a predetermined level, the liquid crystal has a defect that it cannot display a fast-varying motion picture of high quality. In order to solve such a problem, when a gradation value varies between successive frames, a driving method, in which an overvoltage is applied to a liquid crystal so as to cause transmissivity of the liquid crystal to reach a predetermined level within a period of one frame, is employed (e.g., see Patent Document 1). More specifically, image data of a frame preceding by one frame is compared with image data of the current frame on a pixel-by-pixel basis. If it is decided that the gradation value varies between pixels, an amount of correction corresponding to an amount of change is added to the image data of the current frame. As a result, when a gradation value increases as compared with that of the pixel of a frame preceding by one frame, a drive voltage higher than a normal voltage is applied to the liquid crystal panel; whereas, when a gradation value decreases, a drive voltage lower than a normal voltage is applied to the liquid crystal panel.

The implementation of the aforementioned method requires a frame memory for outputting image data of the frame preceding by one frame. In recent years, since number of display pixels increases due to increased size of the liquid crystal panel, capacity of the frame memory is also required to be increased. Furthermore, since the increased number of display pixels increases the amount of data written in the frame memory or read out from the frame memory in a predetermined period (e.g., in a period of one frame), it is necessary to increase a data transmission rate by increasing a clock frequency for controlling the writing and reading operation. Such increased capacity of the frame memory and such increased data transmission rate lead to an increase in the cost of a liquid crystal display device.

In order to solve such problems, in an image processing circuit for driving a liquid crystal described in Patent Document 2, the necessary capacity of a frame memory is decreased by encoding image data and then storing the encoded image data in the frame memory. Further, the image data is corrected in accordance with a result of comparison between decoded image data of the current frame obtained by decoding the encoded image data and decoded image data of a frame preceding by one frame obtained by delaying the encoded image data by a period of one frame and then decoding it. As a result, when still picture data is inputted, an unwanted overvoltage caused by errors in encoding and decoding operation can be prevented from being applied to the liquid crystal.

Patent Document 1 is Japanese Patent Publication No. 2,616,652 (Paragraphs 0025-0026, FIG. 14), and Patent Document 2 is Japanese Patent Application Kokai (Laid-Open) Publication No. 2004-163842 (Paragraphs 0021-0042, FIG. 1).

DISCLOSURE OF THE INVENTION

Problem to be Solved by the Invention

In the image processing circuit for driving a liquid crystal described in Patent Document 2, the encoding is carried out by a block encoding method, in which number of pixels of quantized image data in encoded image data is constant regardless of the format of a received image. Thus, when the amount of encoded image data is decreased by increasing a compression rate of the encoding, an error caused by the encoding and decoding increases and it largely reflects the corrected image data. This results in a problem that an unwanted overvoltage is applied to the liquid crystal when the amount of encoded image data is decreased by increasing the compression rate of the encoding.

The present invention has been made for solving the problems in the above-mentioned conventional art, it is therefore an object of the present invention to provide an image encoding device, an image processing device including the image encoding device, an image display device including the image processing device, an image encoding method, and an image processing method, which can reduce an amount of encoded image data while suppressing an encoding error.

Means of Solving the Problems

An image encoding device according to the present invention includes: an image data blocking unit which divides image data of a current frame into a plurality of blocks to obtain block image data, thereby outputting the block image data; a dynamic range generator which finds a dynamic range of the block image data, thereby outputting dynamic range data indicative of the dynamic range; an average value generator which calculates an average value of the block image data, thereby outputting average value data indicative of the average value of the block image data; a number-of-pixel reducing unit which receives reduction-number of pixels and reduces number of pixels of the block image data by the reduction-number of pixels, thereby generating reduced-number-of-pixel block image data; an encoding parameter generator which generates an encoding parameter specifying a quantization bit rate and the reduction-number of pixels in accordance with the dynamic range data; a quantization threshold generator which generates a quantization threshold value in accordance with the dynamic range data, the average value data, and the encoding parameter; and an image data quantizer which quantizes the reduced-number-of-pixel block image data with use of the quantization threshold value, thereby generating quantized image data.

Further, an image processing device according to the present invention includes: in addition to the above-mentioned image encoding device, a first decoder which decodes the encoded image data to obtain first decoded image data corresponding to the image data of the current frame, thereby outputting the first decoded image data; a delay unit which delays the encoded image data by a period corresponding to one frame; a second decoder which decodes the encoded image data outputted from the delay unit to obtain second decoded image data corresponding to image data of a frame preceding the current frame by one frame, thereby outputting the second decoded image data; an amount-of-change calculator which calculates an amount of change in each pixel between the first decoded image data and the second decoded image data; a one-frame preceding image computing unit which calculates reproduction image data corresponding to the one-frame preceding image data with use of the amount of change and the image data of the current frame; and an image data correction unit which corrects a gradation value of the image data of the current frame in accordance with the image data of the current frame and the reproduction image data.

Furthermore, the image display device according to the present invention includes: the above-mentioned image processing device; and a display which displays an image based on the image data outputted from the image processing device.

Moreover, an image encoding method according to the present invention includes the steps of: dividing image data of a current frame into a plurality of blocks to obtain block image data, thereby outputting the block image data; finding a dynamic range of the block image data, thereby outputting dynamic range data indicative of the dynamic range; calculating an average value of the block image data, thereby outputting average value data indicative of the average value of the block image data; generating an encoding parameter specifying a quantization bit rate and the reduction-number of pixels in accordance with the dynamic range data; reducing number of pixels of the block image data by the reduction-number of pixels, thereby generating reduced-number-of-pixel block image data; generating a quantization threshold value in accordance with the dynamic range data, the average value data, and the encoding parameter; and quantizing the reduced-number-of-pixel block image data with use of the quantization threshold value, thereby generating quantized image data.

Further, an image processing method according to the present invention includes the steps of: encoding input image data of a current frame to obtain encoded image data by the above-mentioned image encoding method, thereby outputting the encoded image data; decoding the encoded image data to obtain first decoded image data corresponding to the image data of the current frame, thereby outputting the first decoded image data; delaying the encoded image data by a period corresponding to one frame; decoding the delayed encoded image data to obtain second decoded image data corresponding to image data of a frame preceding the current frame by one frame, thereby outputting the second decoded image data; calculating an amount of change in each pixel between the first decoded image data and the second decoded image data; calculating reproduction image data corresponding to the one-frame preceding image data with use of the amount of change and the image data of the current frame; and correcting a gradation value of the image data of the current frame in accordance with the image data of the current frame and the reproduction image data.

Furthermore, another image processing device according to the present invention, which corrects image data indicative of a gradation value of each pixel of an image corresponding to a voltage applied to a liquid crystal in accordance with an amount of change in the gradation value of each pixel and outputs the corrected image data, includes: an encoder which quantizes image data of a current frame on a block-by-block basis to obtain encoded image data corresponding to the image of the current frame, thereby outputting the encoded image data; a first decoder which decodes the encoded image data outputted from the encoder to obtain first decoded image data corresponding to the image data of the current frame, thereby outputting the first decoded image data; a delay unit which delays the encoded image data outputted from the encoder by a period corresponding to one frame; a second decoder which decodes the encoded image data outputted from the delay unit to obtain second decoded image data corresponding to image data of a frame preceding the current frame by one frame, thereby outputting the second decoded image data; a first high frequency component emphasizer which emphasizes high frequency components of the first decoded image data; a second high frequency component emphasizer which emphasizes high frequency components of the second decoded image data; an amount-of-change calculator which calculates an amount of change in each pixel between image data, high frequency component of which is emphasized by the first high frequency component emphasizer, and image data, high frequency component of which is emphasized by the second high frequency component emphasizer; a one-frame preceding image computing unit which calculates reproduction image data corresponding to the one-frame preceding image data with use of the amount of change and the image data of the current frame; and a correction unit which corrects a gradation value of the image data of the current frame in accordance with the image data of the current frame and the reproduction image data; wherein the encoder includes a number-of-pixel reducing unit which reduces number of pixels of image data of each block in the image data of the current frame and adjusts reduction-number of pixels of the image data of the current frame in each block in accordance with the dynamic range of the image data of the current frame in each block.

Effects of the Invention

According to the present invention, when image data of a current frame is quantized on a block-by-block basis to output encoded image data, the reduction-number of pixels indicative of a value, by which the number of pixels of the quantized image data in the encoded image data is reduced, is adjusted in accordance with the dynamic range of each block. Accordingly, the present invention can advantageously reduce an amount of encoded image data while suppressing an encoding error.

Further, an image display device according to the present invention can reduce an encoding error occurring when the amount of encoded image data is reduced, and can suitably control the response speed of a display while avoiding application of an unwanted overvoltage caused by the influence of the encoding error.

BRIEF DESCRIPTION OF THE DRAWINGS

FIGS. 2A to 2C are diagrams showing a response characteristic of a liquid crystal, wherein FIG. 2A shows time variation of a brightness value of the current image data, FIG. 2B shows time variation of a brightness value (i.e., a value corresponding to an applied voltage to the liquid crystal) of corrected image data, and FIG. 2C shows time variation of display brightness of a liquid crystal panel obtained by applying a voltage based on the corrected image data of FIG. 2B;

FIGS. 16A, 16B1, 16B2, 16C1, and 16C2 are diagrams showing examples of data structure of encoded image data in the second embodiment;

FIGS. 17A, 17B1, 17B2, 17C1, and 17C2 are diagrams showing other examples of data structure of encoded image data in the second embodiment;

DESCRIPTION OF REFERENCE NUMERALS

1 input terminal; 2 receiver; 3 image data processor (image processing device); 4 encoder (image encoding device); 5 delay unit; 6 first decoder; 7 second decoder; 8 amount-of-change calculator; 9 one-frame preceding image computing unit; 10 image data correction unit; 11 display; 12 image data blocking unit; 13 dynamic range generator; 14 average value generator; 15 quantizer; 16 encoded data synthesizer; 17 threshold generator; 18 encoding parameter generator; 19 quantization threshold generator; 20 number-of-pixel reducing unit; 21 image data quantizer; 22 threshold generator; 23 encoding parameter determination unit; 24 encoding data divider; 25 image data restoration value generator; 26 image data restoring unit; 27 image data interpolator; 28 look-up table; 29 correcting part; 30 look-up table; 40 image data processor; 41, 42, 43 color space converter; 44 image data processor; 45 first high frequency component emphasizer; 46 second high frequency component emphasizer; 47 high frequency component detector; 48 amount-of-emphasis generator; 49 amount-of-emphasis adder; 50 multiplier; 51 number-of-pixel reduction determination unit; 52 image data processor.

BEST MODE FOR CARRYING OUT THE INVENTION

First Embodiment

Figure 1:
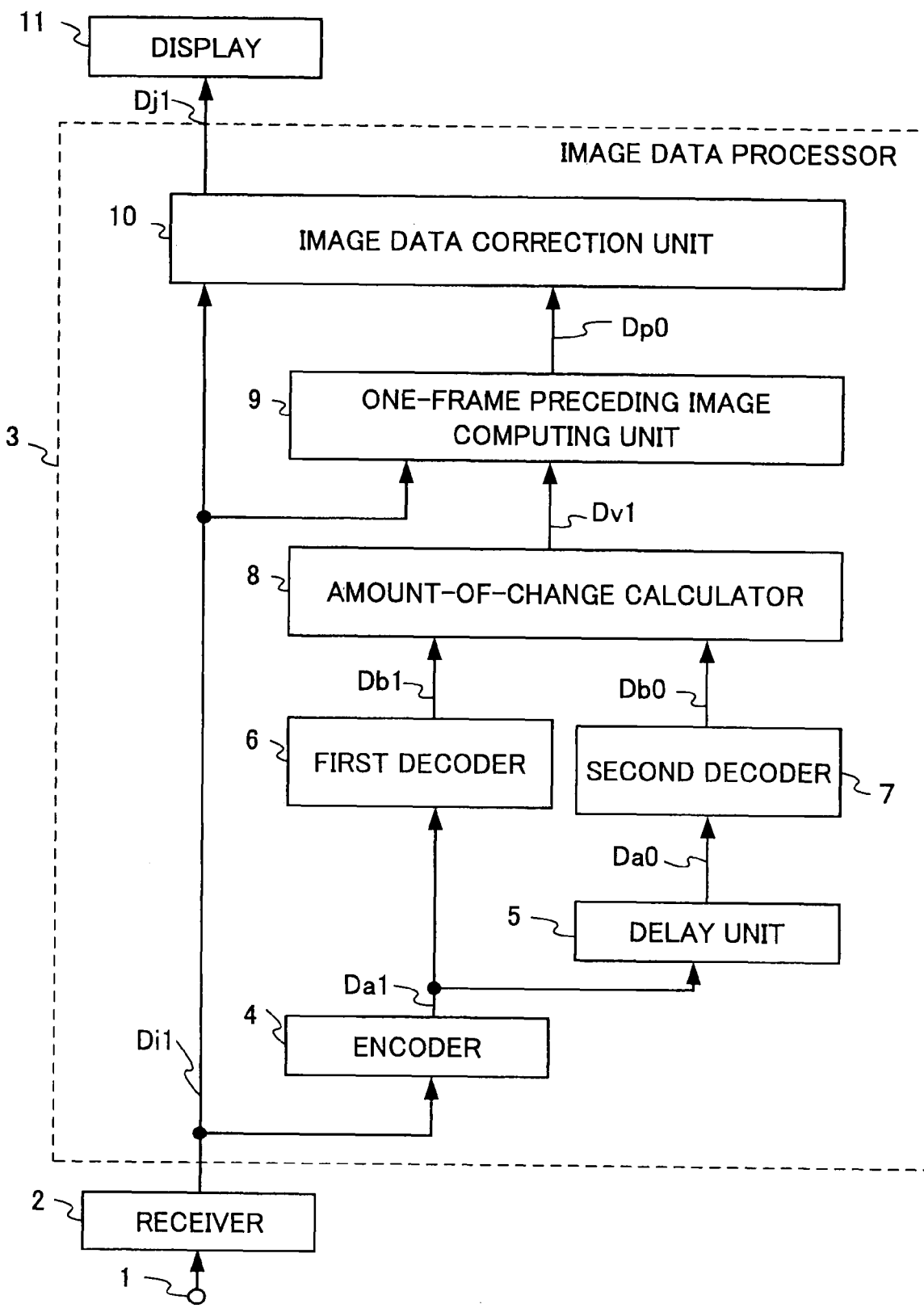
FIG. 1 is a block diagram showing a configuration of an image display device including an image processing device (i.e., an image data processor) according to the first embodiment of the present invention.

FIG. 1 is a block diagram showing a configuration of an image display device including an image data processor 3 which is an image processing device according to the first embodiment of the present invention. As shown in FIG. 1, the image display device includes, as its main constituent elements, a receiver 2, an image data processor 3, and a display 11. In this application, constituent elements shown by " . . . unit", " . . . er" or " . . . or" may be implemented in the form of hardware including an electric circuit or the like, in the form of software, or in the form of a combination of software and hardware. Further, the image data processor 3 is a device capable of implementing an image processing method of the present invention. Furthermore, the image display device shown in FIG. 1 is, for example, a liquid crystal television set.

The receiver 2 includes a television tuner and other elements. The receiver 2 receives a video signal through an input terminal 1, processes the video signal for channel selection, demodulation and so on to generate a current image data Di1 indicative of an image of one frame (i.e., an image of the current frame or a current image), and sequentially outputs it to the image data processor 3.

As shown in FIG. 1, the image data processor 3 includes an encoder 4 which is an image encoding device according to the first embodiment of the present invention, a delay unit 5, a first decoder 6, a second decoder 7, an amount-of-change calculator 8, a one-frame preceding image computing unit 9, and an image data correction unit 10. The image data processor 3 corrects the current image data Di1 in accordance with an amount of change in the gradation value, and outputs corrected image data Dj1 to the display 11.

A display panel of the display 11 is, for example, a liquid crystal panel. The display 11 changes transmissivity of each pixel in the liquid crystal by applying a voltage corresponding to the corrected image data Dj1 indicative of an image brightness or image gradation to the liquid crystal panel, thereby displaying an image.

Explanation will next be made as to operation of the image data processor 3. The encoder 4 encodes the current image data Di1 to compress an amount of data, thereby generating encoded image data Da1. As a coding scheme of the encoder 4, block truncation coding (BTC) such as FBTC (Fixed Block Truncation Coding) or GBTC (Generalized Block Truncation Coding) can be used. Further, as a coding scheme of the encoder 4, a two-dimensional discrete cosine transform coding typified by JPEG, a predictive coding typified by JPEG-LS, or a coding scheme using wavelet transform typified by JPEG2000 can also be employed. Any other coding scheme can be employed as long as it is a scheme for still images. Furthermore, as the coding scheme for still images, such an irreversible coding that image data before encoded does not coincide completely with image data after decoded, can be used. In this example, as will be described later, the encoder 4 determines number of pixels of quantized image data in the encoded image data in accordance with the size of the dynamic range of each block, that is, determines reduction-number of pixels indicative of a value, by which number of pixels of each block is reduced to obtain a reduced number of pixels, and outputs the encoded image data Da1 having the reduced number of pixels.

The delay unit 5 delays the encoded image data Da1 generated in the encoder 4 by a period corresponding to one frame to obtain an encoded image data Da0 of a frame preceding by one frame, and outputs the encoded image data Da0. The higher an encoding rate (i.e., a data compression rate) of the image data Di1 in the encoder 4 is made, the smaller the storage capacity of a memory (not shown) in the delay unit 5 required for delaying the encoded image data Da1 can be made.

The first decoder 6 determines a quantization bit rate of the encoded image data Da1 on a block-by-block basis and decodes the encoded image data Da1 on a block-by-block basis to obtain decoded image data Db1 corresponding to the current image data Di1, and outputs the decoded image data Db1. Further, the second decoder 7 determines a quantization bit rate of the encoded image data Da0 delayed by the delay unit 5 by a period corresponding to one frame on a block-by-block basis and decodes the encoded image data Da0 on a block-by-block basis to obtain decoded image data Db0 indicative of image data of a frame preceding by one frame, and outputs the decoded image data Db0.

The amount-of-change calculator 8 subtracts the first decoded image data Db1 from the second decoded image data Db0 with use of the first decoded image data Db1 corresponding to the current image and the second decoded image data Db0 corresponding to the image of a frame preceding by one frame, thereby calculating an amount of change Dv1 of the gradation value of each pixel between the one-frame preceding image and the current image. The amount of change Dv1 and the current image data Di1 are inputted to the one-frame preceding image computing unit 9.

The one-frame preceding image computing unit 9 adds the amount of change Dv1 of the gradation value outputted from the amount-of-change calculator 8 to the current image data Di1, thereby generating one-frame preceding image data Dp0. The generated one-frame preceding image data Dp0 is inputted to the image data correction unit 10.

The image data correction unit 10 corrects the current image data Di1 in accordance with the amount of change in the gradation value for a period of one frame obtained by comparison between the current image data Di1 and the one-frame preceding image data Dp0 in such a manner that transmissivity of the liquid crystal reaches a predetermined level specified by the image data Di1 within a period of one frame, and then outputs the corrected image data Dj1.

Figure 2A:
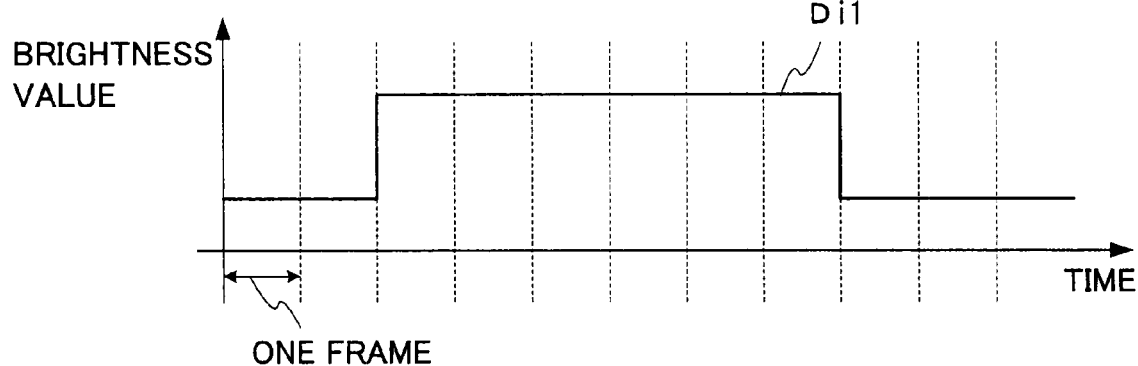
Figure 2B:
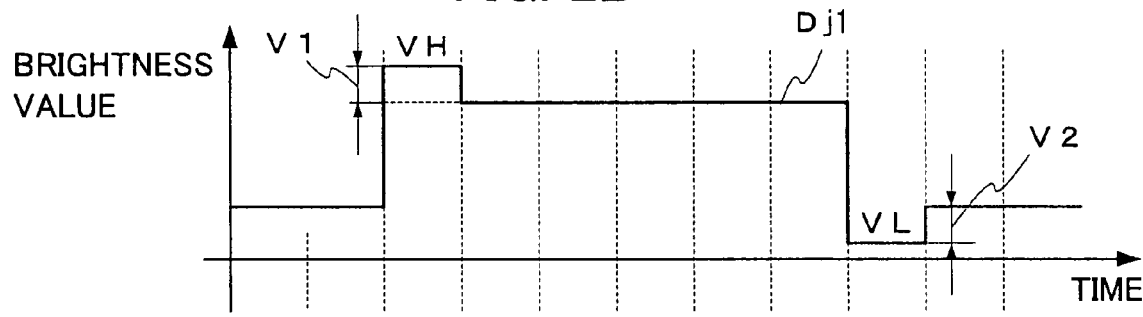
Figure 2C:
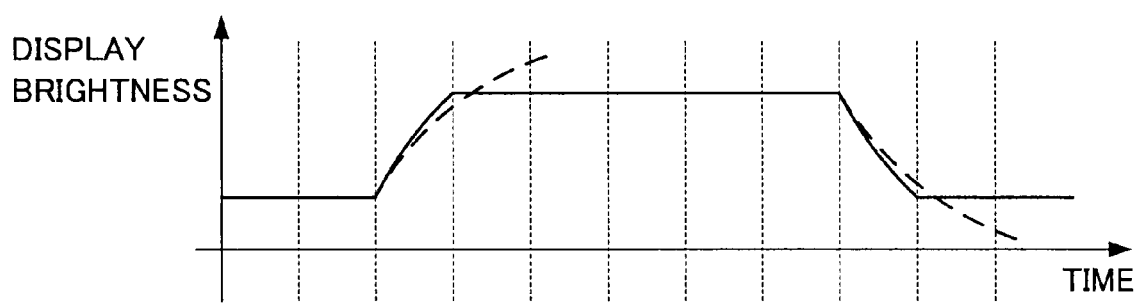

FIGS. 2A to 2C are diagrams showing response characteristics when a drive voltage based on the corrected image data Dj1 is applied to the liquid crystal. FIG. 2A shows time variation of the gradation value (i.e., brightness value) of the current image data Di1, and FIG. 2B shows time variation of the gradation value (i.e., brightness value) of the corrected image data Dj1. In FIG. 2C, a solid line denotes time variation of display brightness of the liquid crystal panel (i.e., the response characteristic of the liquid crystal panel) obtained when the drive voltage based on the corrected image data Dj1 is applied to the liquid crystal, and a broken line denotes a response characteristic of the liquid crystal panel when a drive voltage (VH or VL shown in FIG. 2B) based on the corrected image data Dj1 is continuously applied to the liquid crystal. As shown in FIG. 2B, when the gradation value is increased or decreased, the corrected image data Dj1 is generated by adding or subtracting an amount of correction V1 or V2 to or from the current image data Di1 respectively. By applying the drive voltage based on the corrected image data Dj1 to the liquid crystal, the transmissivity of the liquid crystal can reach a predetermined level corresponding to the gradation value of the current image data Di1 nearly within a period of approximately one frame, as shown by the solid line in FIG. 2C.

Figure 3:
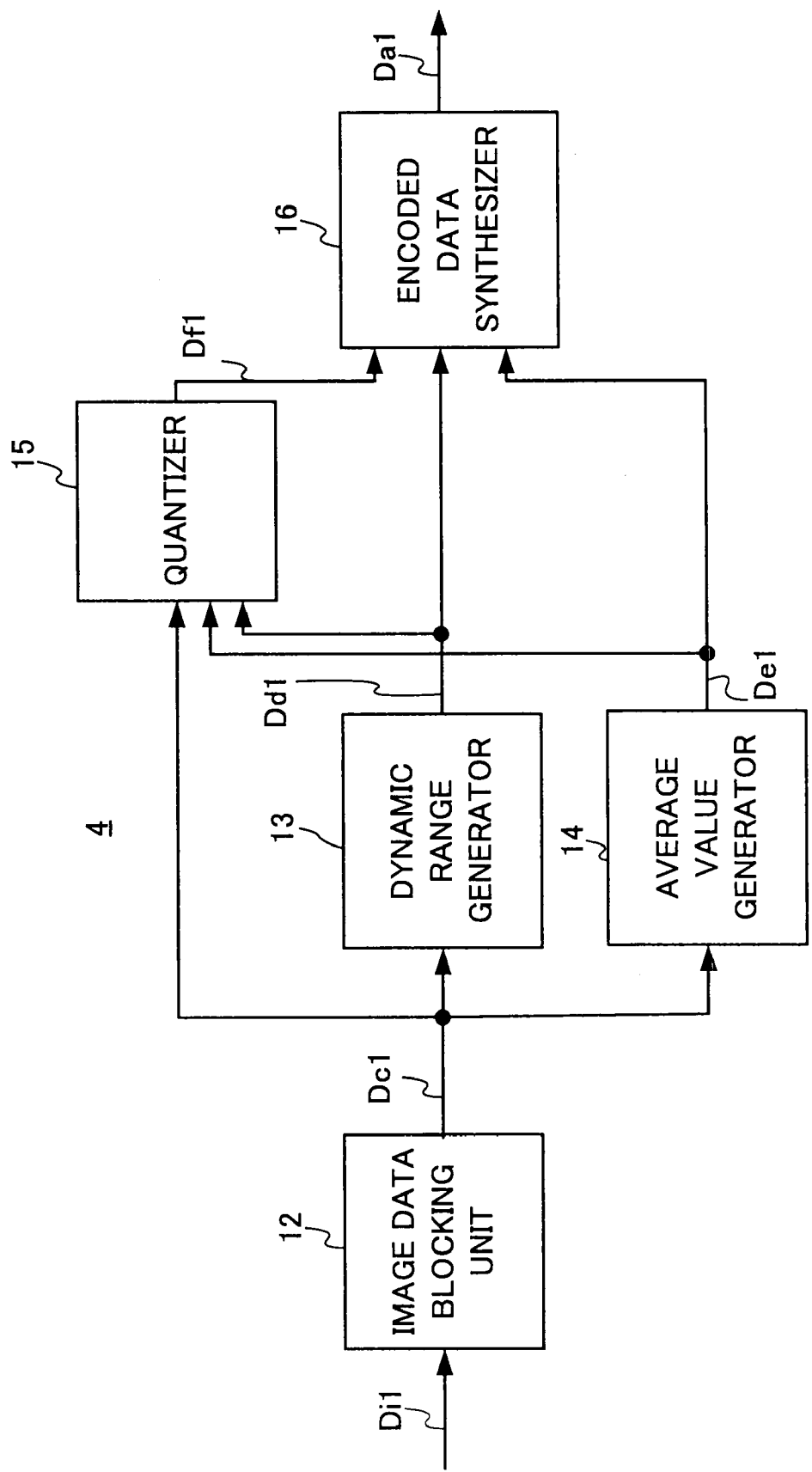
FIG. 3 is a block diagram showing a configuration of an image encoding device (i.e., an encoder shown in FIG. 1) according to the first embodiment.

Explanation will next be made as to a configuration and operation of the encoder 4 in the image encoding device according to the first embodiment. FIG. 3 is a block diagram schematically showing a configuration of the encoder 4. As shown in FIG. 3, the encoder 4 includes, as its main constituent elements, an image data blocking unit 12, a dynamic range generator 13, an average value generator 14, a quantizer 15, and an encoded data synthesizer 16. The image data blocking unit 12 divides the current image data Di1 into a plurality of blocks each having a predetermined number of pixels, thereby generating block image data Dc1. The dynamic range generator 13 finds a dynamic range for each block image data Dc1 outputted from the image data blocking unit 12 to output dynamic range data Dd1 indicative of the dynamic range. The average value generator 14 calculates an average value of each block image data Dc1 outputted from the image data blocking unit 12 to obtain average value data De1 indicative of the average value, and outputs it. The quantizer 15 quantizes each block image data Dc1 outputted from the image data blocking unit 12 to obtain quantized image data Df1, and outputs it. The encoded data synthesizer 16 combines the dynamic range data Dd1, the average value data De1, and the quantized image data Df1 by bit combining to obtain combined data, and outputs the combined data as the encoded image data Da1.

Figure 4:
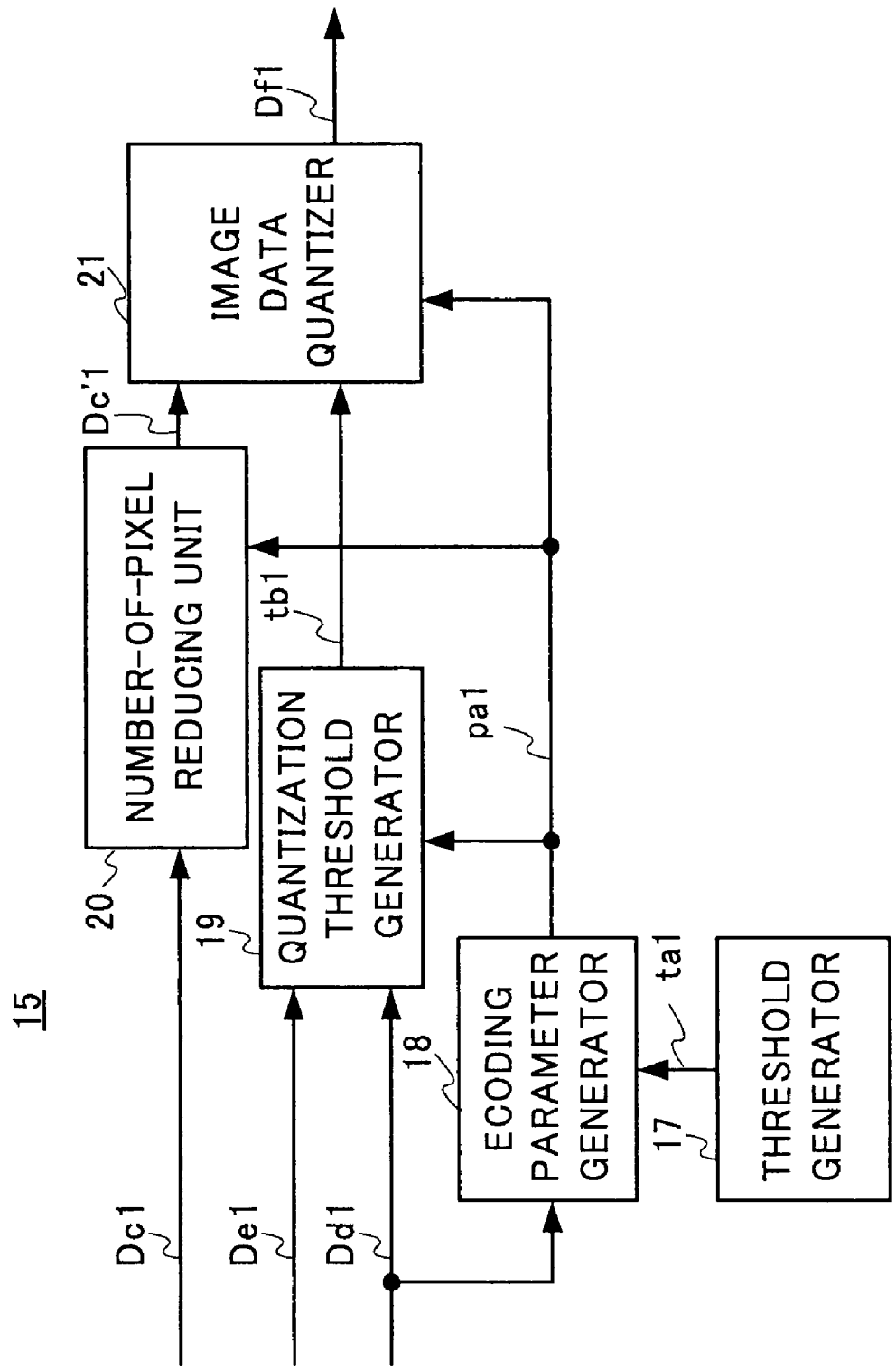
FIG. 4 is a block diagram showing a configuration of a quantizer shown in FIG. 3.

FIG. 4 is a block diagram schematically showing a configuration of the quantizer 15. As shown in FIG. 4, the quantizer 15 includes, as its main constituent elements, a threshold generator 17, an encoding parameter generator 18, a quantization threshold generator 19, a number-of-pixel reducing unit 20, and an image data quantizer 21.

The threshold generator 17 outputs a changeover threshold value ta1 to be used when the quantization bit rate of the block image data Dc1 is switched in accordance with the dynamic range size of the dynamic range data Dd1. The changeover threshold value ta1 is set, for example, at the stage of manufacturing the image processing device.

The encoding parameter generator 18 determines the quantization bit rate of the block image data Dc1 in accordance with the result of comparison between the dynamic range data Dd1 and the changeover threshold value ta1. Further, the encoding parameter generator 18 determines the reduction-number of pixels of the block image data Dc1 in accordance with the result of comparison between the dynamic range data Dd1 and the changeover threshold value ta1. The encoding parameter generator 18 outputs an encoding parameter pa1 which specifies the determined quantization bit rate and the determined reduction-number of pixels.

The quantization threshold generator 19 calculates a quantization threshold value tb1 to be used when the block image data Dc1 is quantized, in accordance with the dynamic range data Dd1, the average value data De1, and the quantization bit rate specified by the encoding parameter pa1. The quantization threshold value tb1 is set in accordance with threshold value data corresponding to a value obtained by subtracting a value of one from a value indicative of the quantization bit rate.

The number-of-pixel reducing unit 20 reduces the number of pixels of the block image data Dc1 by the reduction-number of pixels specified by the encoding parameter pa1, and outputs reduced-number-of-pixel block image data Dc1' of pixels, number of which is not larger than the number of pixels of the block image data Dc1. As a method for reducing the number of pixels in the number-of-pixel reducing unit 20, various kinds of methods such as a simple pixel thinning method or a method of generating an average of values of a plurality of adjacent pixels may be employed so long as the method can reduce the number of pixels.

The image data quantizer 21 quantizes each pixel data of the reduced-number-of-pixel block image data Dc1' with use of the threshold value data included in a signal of the quantization threshold value tb1 to obtain the quantized image data Df1, and outputs it.

Since when the dynamic range specified by the dynamic range data Dd1 of the block image data Dc1 is small, an error caused by reducing the number of pixels is small, the encoding parameter pa1 specifies a large reduction-number of pixels. Since when the dynamic range specified by the dynamic range data Dd1 of the block image data Dc1 is large, an error caused by reducing the number of pixels is large, the encoding parameter pa1 specifies a small reduction-number of pixels. In this way, since the reduction-number of pixels of the block image data Dc1 is adjusted in accordance with the dynamic range, the encoding error can be minimized and the encoded image data Da1 can be made small in size.

Figure 5:
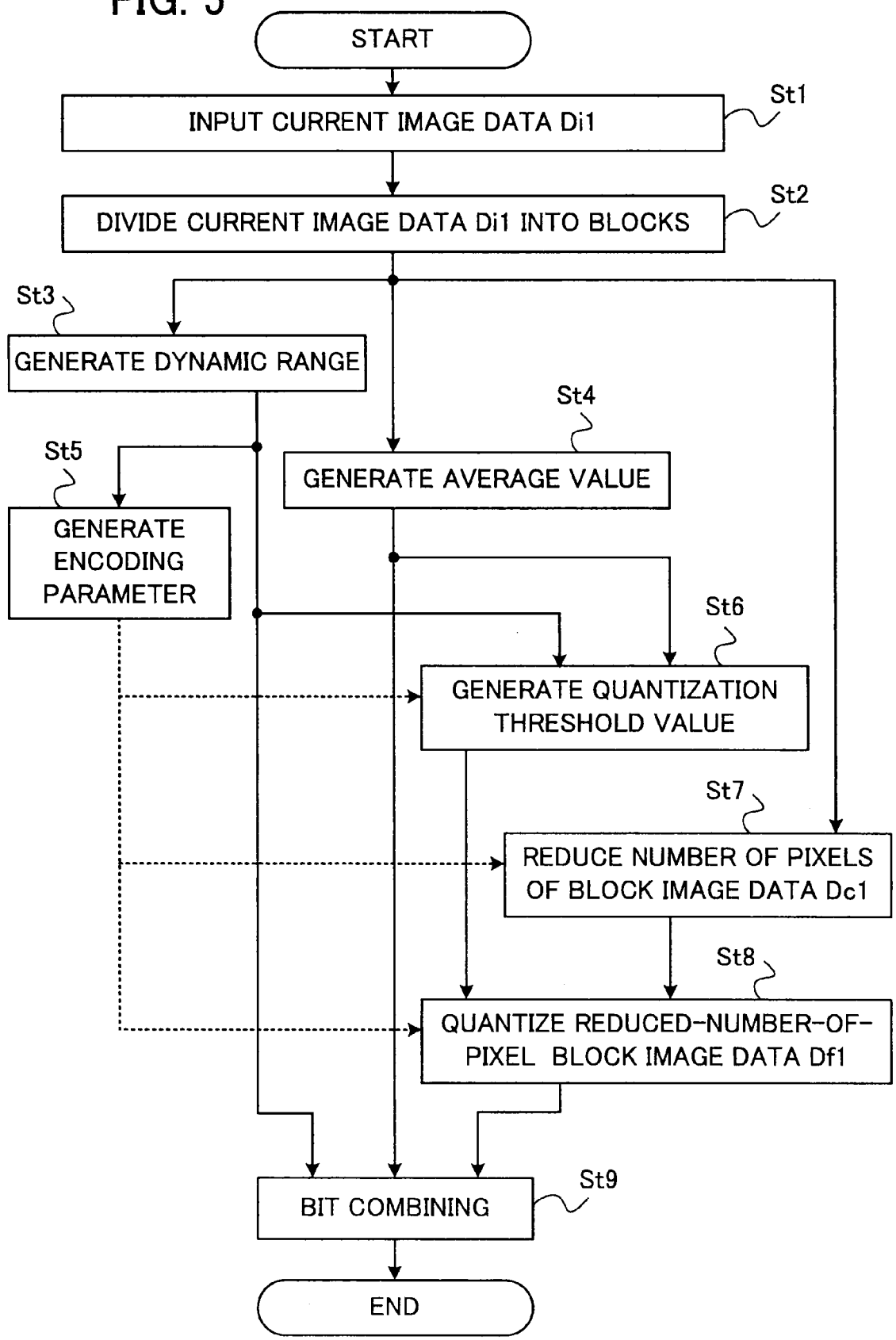
FIG. 5 is a flowchart showing operation of the encoder according to the first embodiment.

FIG. 5 is a flowchart showing steps of encoding operations in the encoder 4. When the current image data Di1 is inputted to the image data blocking unit 12 (step St1), the image data blocking unit 12 divides the current image data Di1 into a plurality of blocks to obtain the block image data Dc1, and outputs the block image data Dc1 (step St2). Next, the dynamic range generator 13 detects the dynamic range of the block image data Dc1, thereby generating the dynamic range data Dd1 (step St3). The average value generator 14 calculates an average value of the block image data Dc1 to generate the average value data De1 (step St4). The encoding parameter generator 18 determines a quantization bit rate in accordance with a result of comparison between the dynamic range data Dd1 and the changeover threshold value ta1, determines reduction-number of pixels in accordance with the dynamic range data Dd1, and outputs the encoding parameter pa1 specifying the determined quantization bit rate and the determined reduction-number of pixels (step St5). Next, the quantization threshold generator 19 calculates the quantization threshold value tb1 corresponding to the quantization bit rate specified by the encoding parameter pa1 (step St6). The number-of-pixel reducing unit 20 reduces the number of pixels of the block image data Dc1 by the reduction-number of pixels specified by the encoding parameter pa1, and outputs the reduced-number-of-pixel block image data Dc1' of pixels, number of which is not larger than the number of pixels of the block image data Dc1 (step St7). Next, the image data quantizer 21 quantizes each pixel data of the reduced-number-of-pixel block image data Dc1' in accordance with the quantization threshold value tb1 to obtain the quantized image data Df1, and outputs the quantized image data Df1 (step St8). The encoding data synthesizer 18 combines the dynamic range data Dd1, the average value data De1, and the quantized image data Df1 by bit combining to obtain the encoded image data Da1, and outputs the encoded image data Da1 (step St9).

Figure 6:
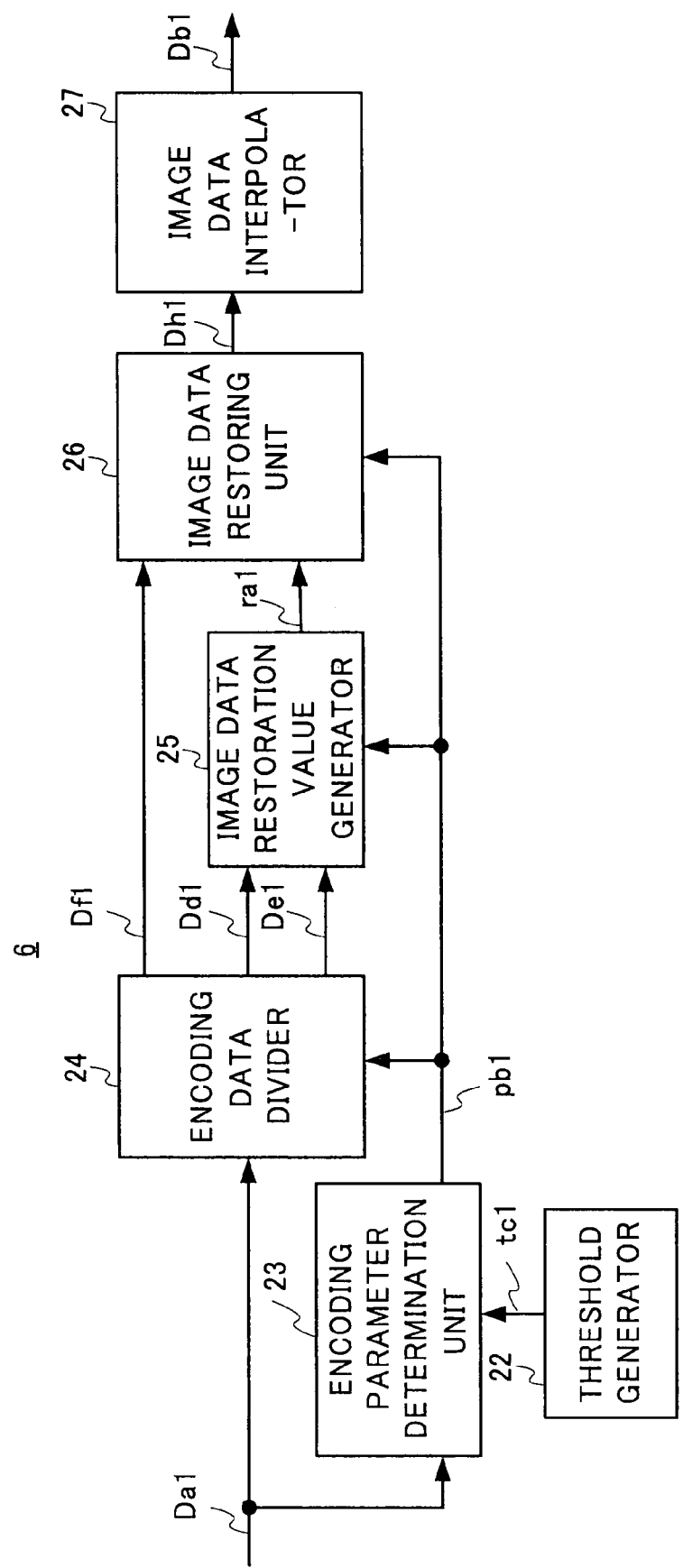
FIG. 6 is a block diagram showing a configuration of a decoder shown in FIG. 1.

Explanation will then be made as to configurations and operation of the first decoders 6 and the second decoder 7. FIG. 6 is a block diagram showing a configuration (including the same constituent elements as the second decoder 7) of the first decoder 6. As shown in FIG. 6, the first decoder 6 includes, as its main constituent elements, a threshold generator 22, an encoding parameter determination unit 23, an encoding data divider 24, an image data restoration value generator 25, an image data restoring unit 26, and an image data interpolator 27.

The threshold generator 22 outputs a determined threshold value tc1 set at the same value as the changeover threshold value ta1 of the encoding parameter.

The encoding parameter determination unit 23 compares a value of the dynamic range specified by the dynamic range data Dd1 included in the encoded image data Da1 with the determined threshold value tc1, finds the encoding parameter pa1 of the encoded image data Da1, and outputs the determined parameter as an encoding parameter pb1.

The encoding data divider 24 divides the encoded image data Da1 into the dynamic range data Dd1, the average value data De1, and the quantized image data Df1 by referring to the encoding parameter pb1, and outputs the divided data.

The image data restoration value generator 25 generates restored value data ra1 from the dynamic range data Dd1 and the average value data De1 in accordance with the encoding parameter pb1, and outputs it. The restored value data ra1 is data made up of restored values corresponding to quantization values of the quantized image data, and the number of the restored values corresponds to a value of the quantization bit rate.

The image data restoring unit 26 restores reduced-number-of-pixel decoded image data from the quantized image data Df1 in accordance with the restored value data ra1, and outputs the reduced-number-of-pixel decoded image data Dh1.

The image data interpolator 27 interpolates the reduced-number-of-pixel decoded image data Dh1 having pixels, number of which is not larger than the number of pixels of the block image data Dc1, and outputs the decoded image data Db1 having pixels, number of which is equal to the number of pixels of the block image data Dc1.

Figure 7:
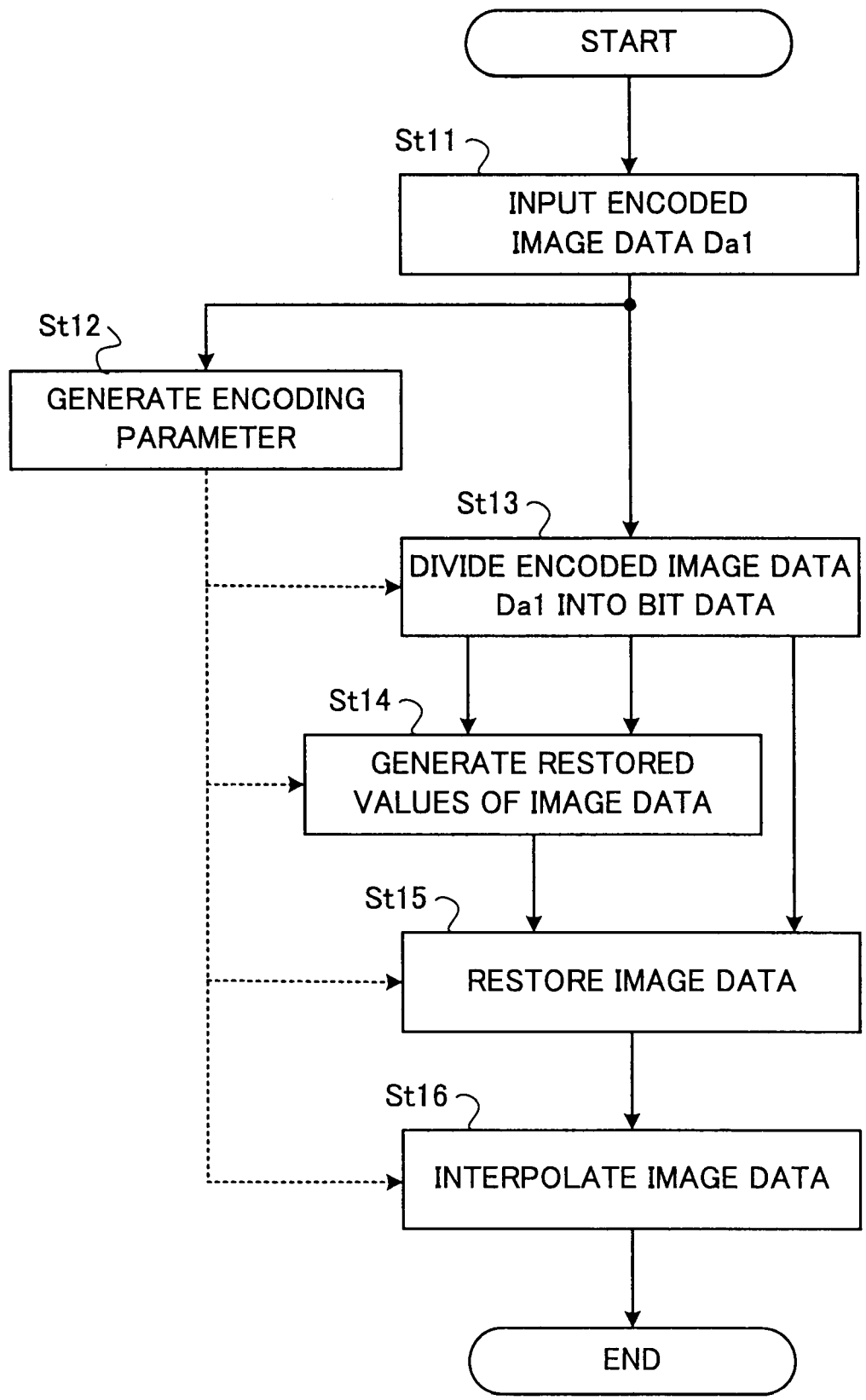
FIG. 7 is a flowchart showing operation of the decoder shown in FIG. 6.

FIG. 7 is a flowchart showing steps of decoding operation in the first decoder 6 and the second decoder 7. When the encoded image data Da1 is inputted to the encoding parameter determination unit 23 and the encoding data divider 24 (step St11), the encoding parameter determination unit 23 compares the dynamic range data Dd1 included in the encoded image data Da1 with the changeover threshold value ta1, thereby determining the encoding parameter pb1 (step St12). Next, the encoding data divider 24 divides the encoded image data Da1 into the dynamic range data Dd1, the average value data De1, and the quantized image data Df1 by referring to the encoding parameter pb1 (step St13). Next, the image data restoration value generator 25 generates the restored value data ra1 from the dynamic range data Dd1 and the average value data De1 (step St14). Subsequently, the image data restoring unit 26 restores the reduced-number-of-pixel decoded image data from the quantized image data Df1 in accordance with the restored value data ra1, and outputs the reduced-number-of-pixel decoded image data Dh1 (step St15). Next, the image data interpolator 27 interpolates the reduced-number-of-pixel decoded image data Dh1 having pixels, number of which is smaller than the number of pixels of the block image data Dc1, and outputs the decoded image data Db1 having pixels, number of which is equal to the number of pixels of the block image data Dc1 (step St16).

Figure 8:
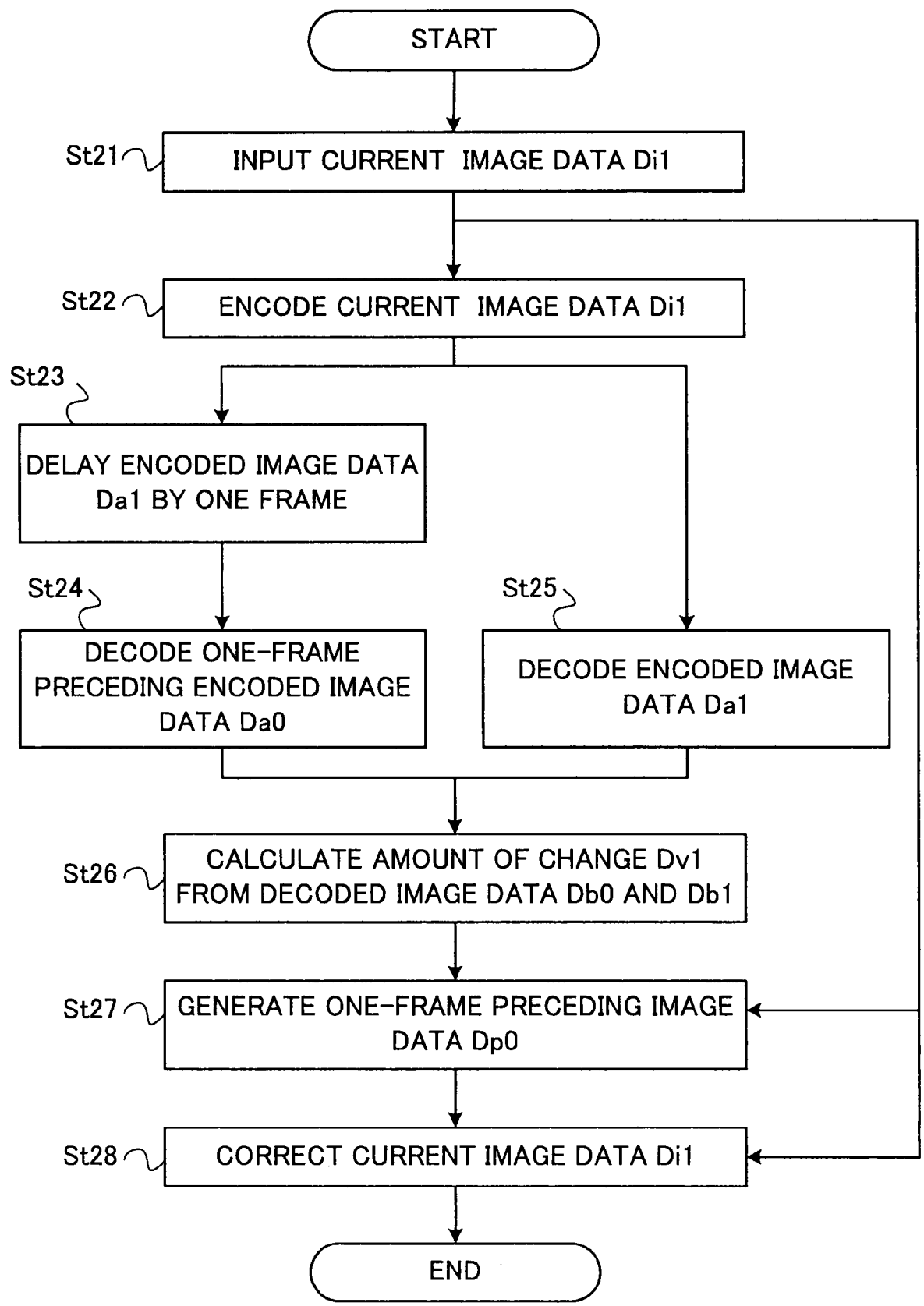
FIG. 8 is a flowchart showing operation of the image processing device according to the first embodiment.

FIG. 8 is a flowchart showing steps of processing in the image data processor 3 as the image processing device according to the first embodiment. When the current image data Di1 is inputted to the image data processor 3 (step St21), the encoder 4 encodes the current image data Di1 through the steps shown in FIG. 5, and outputs the encoded image data Da1 (step St22). The delay unit 5 delays the encoded image data Da1 by a period of one frame, and outputs the encoded image data Da0 of a frame preceding by one frame (step St23). The second decoder 7 decodes the encoded image data Da0 of a frame preceding by one frame through the steps shown in FIG. 7, and outputs the decoded image data Db0 corresponding to the current image data Di0 of a frame preceding by one frame (step St24). Concurrently with operation of the steps St23 and St24, the first decoder 6 decodes the encoded image data Da1 through the steps shown in FIG. 7, and outputs the decoded image data Db1 corresponding to the current image data Di1 of the current frame (step St25).

Next, the amount-of-change calculator 8 subtracts the decoded image data Db1 from the decoded image data Db0 to find an amount of change in the gradation value of each pixel between the image of a frame preceding by one frame and the current image, and outputs a result of the subtracting as an amount of change Dv1 (step St26). Next, the one-frame preceding image computing unit 9 adds the amount of change Dv1 to the current image data Di1, and outputs a result of the adding as the one-frame preceding image data Dp0 (step St27). The image data correction unit 10 finds an amount of correction necessary for driving the liquid crystal in such a manner that the transmissivity of the liquid crystal reaches a predetermined level specified by the current image data Di1 within a period of one frame in accordance with an amount of change in the gradation value obtained by comparison between the one-frame preceding image data Dp0 and the current image data Di1, corrects the current image data Di1 based on the found amount of correction, and outputs the corrected image data Dj1 (FIG. 2B) (step St28). In this connection, processing of the above steps St21 to St28 are carried out on each of the pixels of the current image data Di1.

As has been described above, according to the image processing device of the first embodiment, when the current image data Di1 is encoded, the larger the dynamic range of an image data of a divided block is, the smaller the reduction-number of pixels is; whereas the smaller the dynamic range is, the larger the reduction-number of pixels is. Through such a control, the amount of image data temporarily stored in the frame memory of the delay unit 5 can be reduced while an encoding rate generated in the encoder 4 can be suppressed. As a result, the capacity of the frame memory of the delay unit 5 can be made small.

In the aforementioned explanation, the image data correction unit 10 has calculated an amount of correction in accordance with an amount of change in the gradation value obtained by comparison between the one-frame preceding image data Dp0 and the current image data Di1 to generate the corrected image data Dj1. However, such an arrangement is also possible that the amount of correction may be stored in a memory area such as a look-up table, so that the amount of correction is read out therefrom to correct the current image data Di1.

Figure 9:
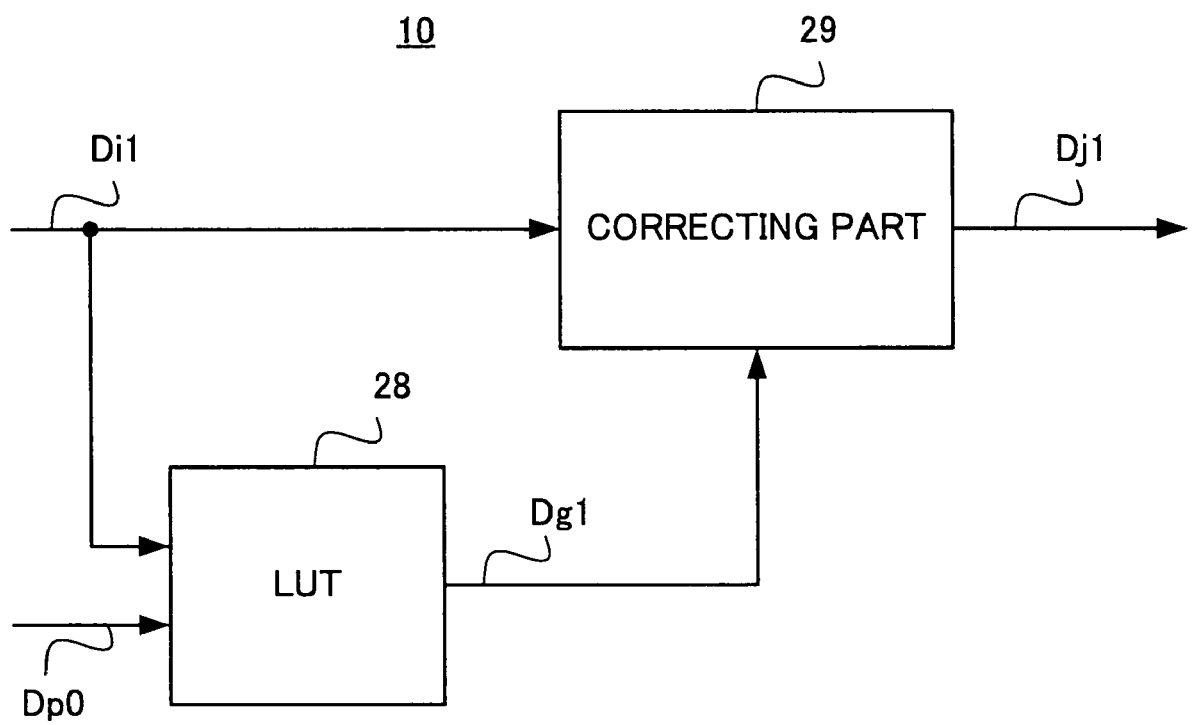
FIG. 9 is a block diagram showing an exemplary configuration of an image data correction unit shown in FIG. 1.

FIG. 9 is a block diagram showing an example of a configuration of the image data correction unit 10. The image data correction unit 10 shown in FIG. 9 has a look-up table (LUT) 28 and a correcting part 29. The look-up table 28 receives the one-frame preceding image data Dp0 and the current image data Di1, and outputs an amount of correction Dg1 generated from values of the both data.

Figure 10:
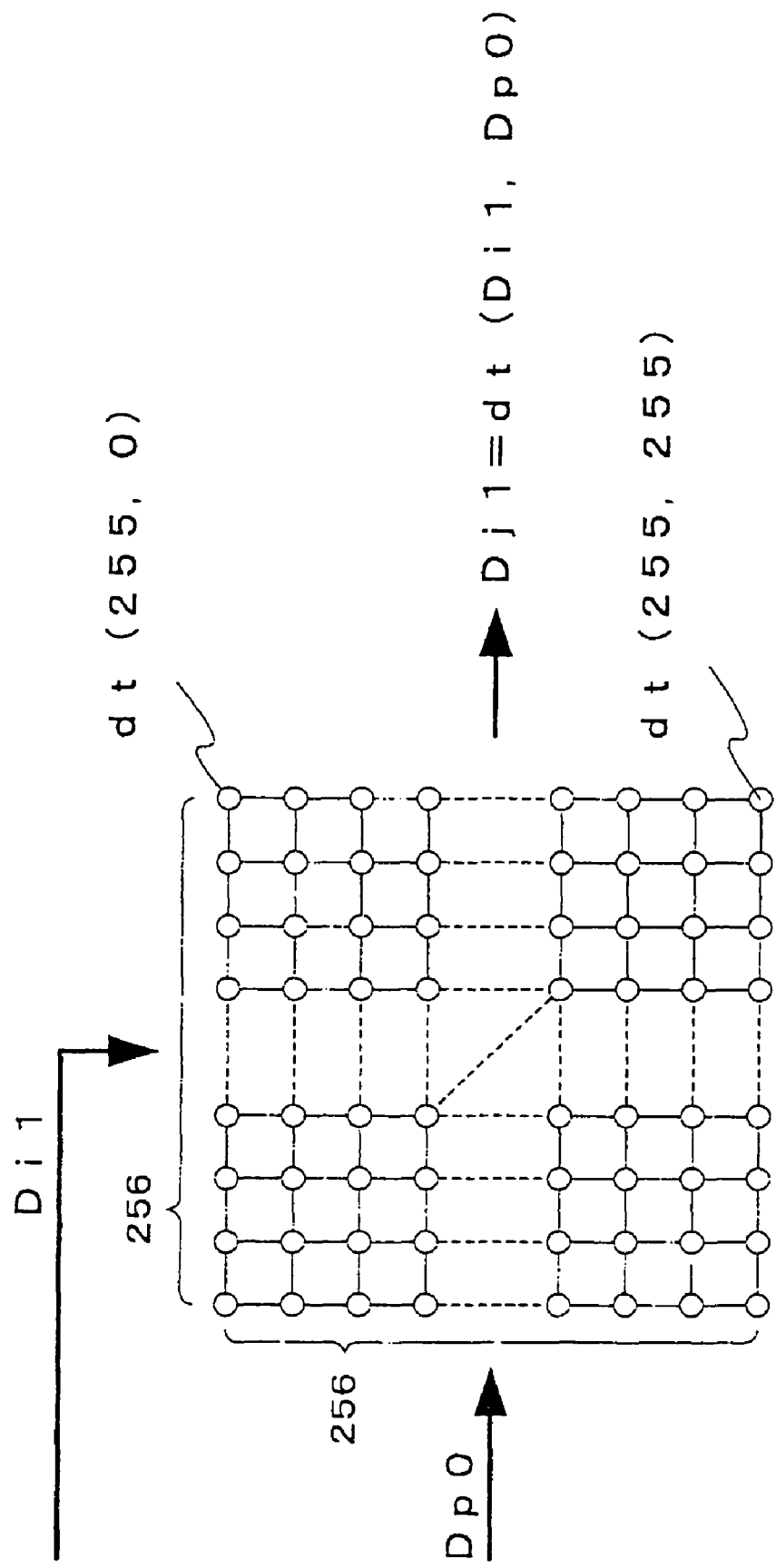
FIG. 10 is a schematic diagram for explaining a configuration of a look-up table shown in FIG. 9.

FIG. 10 is a schematic diagram for explaining an example of a configuration of the look-up table 28 shown in FIG. 9. The current image data Di1 and the one-frame preceding image data Dp0 are inputted to the look-up table 28 as read addresses. When the current image data Di1 and the one-frame preceding image data Dp0 are of eight bits respectively, (256×256) items of data are stored in the look-up table 28 as the amount of correction Dg1. The look-up table 28 reads out and outputs the amount of correction $$Dg1=dt(Di1,Dp0)$$

corresponding to the values of the current image data Di1 and the one-frame preceding image data Dp0. The correcting part 29 adds the amount of correction Dg1 outputted from the look-up table 28 to the current image data Di1 to obtain the corrected image data, and outputs the corrected image data Dj1.

Figure 11:
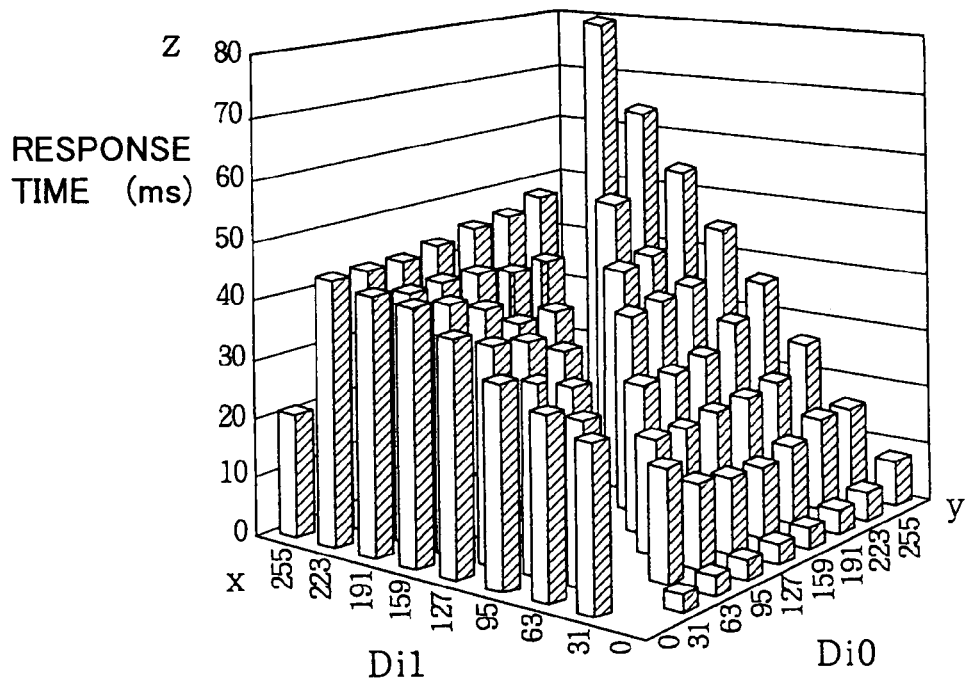
FIG. 11 is a diagram showing an example of a response speed of a liquid crystal.

FIG. 11 is a diagram showing an example of a response time of the liquid crystal. In FIG. 11, an x axis denotes a value (i.e., a gradation value in the current image) of the current image data Di1, a y axis denotes a value (i.e., a gradation value in the one-frame preceding image) of the current image data Di0 of a frame preceding by one frame, and a z axis denotes a response time required after the transmissivity of the liquid crystal has a value corresponding to the gradation value of the one-frame preceding image until the transmissivity of the liquid crystal reaches a value corresponding to the gradation value of the current image data Di1. When the gradation value of the current image has eight bits, there are present combinations of 256 multiplied by 256 between the gradation value of the current image data and the gradation value of the one-frame preceding image data, and therefore there are also present combinations of 256 multiplied by 256 between response times. In FIG. 11, response times of 8 multiplied by 8 corresponding to the combinations between the gradation values are schematically shown.

Figure 12:
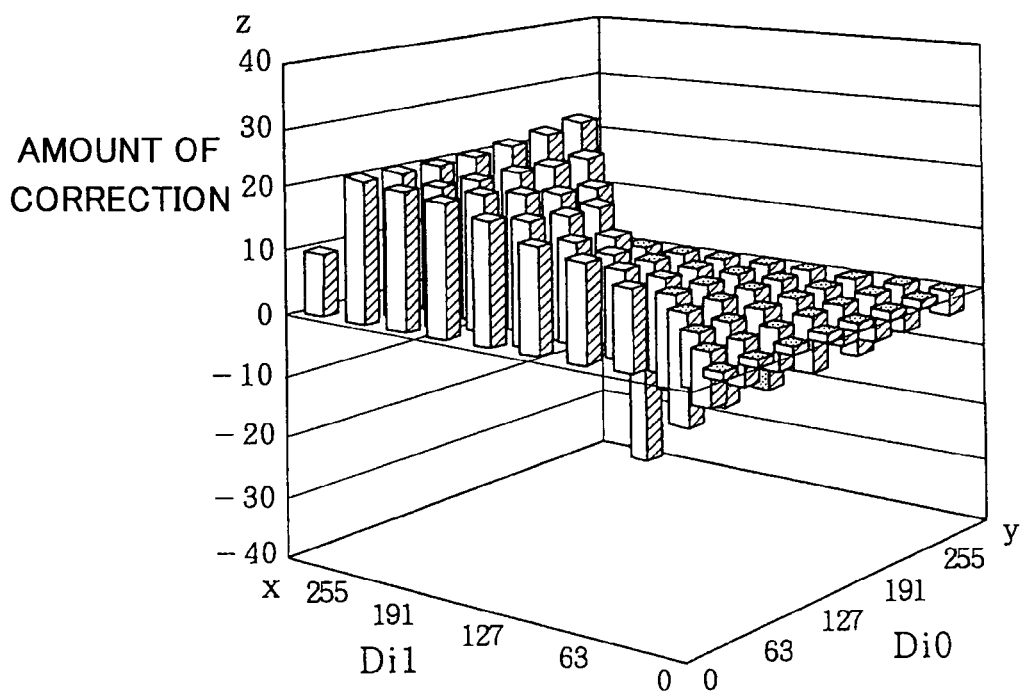
FIG. 12 is a diagram showing an example of an amount of correction.

FIG. 12 is a diagram showing the amount of correction Dg1 which is added to the current image data Di1 so that transmissivity of the liquid crystal reaches a level specified by the current image data Di1 when a period of one-frame is elapsed. When the gradation value of the current image data has eight bits, (256×256) items of the corrected image data Dj1 between the gradation value of the current image data and the gradation value of the one-frame preceding image data are present. In FIG. 12, in a similar manner to FIG. 11, amounts of correction corresponding to combinations of 8 multiplied by 8 between the gradation values are schematically shown.

As shown in FIG. 11, since the response time of the liquid crystal varies with the gradation values of the current image data and the one-frame preceding image data, (256×256) amounts of correction Dg1 corresponding to the both gradation values of the current image data and the one-frame preceding image data are stored in the look-up table 28. The liquid crystal has a slow response speed, in particular, in halftone (gray). Accordingly, when the amounts of correction $$Dg1=dt(di1,Dp0)$$

corresponding to the one-frame preceding image data Dp0 indicative of a halftone and to the current image data Di1 indicative of a high gradation are set at large values, the response speed can be effectively increased. Further, the response characteristic of the liquid crystal varies with the material, electrode shape, temperature and so on of the liquid crystal. Thus, when the amount of correction Dg1 corresponding to such use conditions are previously stored in the look-up table 28, the response time can be controlled in accordance with the characteristic of the liquid crystal.

As mentioned above, by using a look-up table 28 storing previously-found amounts of correction Dg1, the amount of calculation when the corrected image data Dj1 is outputted can be decreased.

Figure 13:
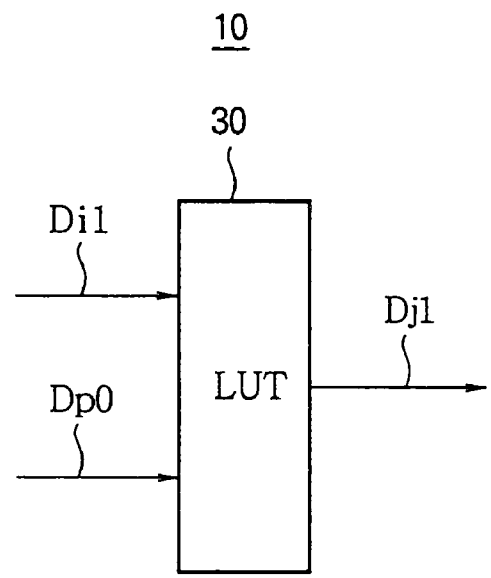
FIG. 13 is a block diagram showing another example of an image data correction unit.

FIG. 13 is a block diagram showing another configuration of the image data correction unit 10 in the first embodiment. A look-up table (LUT) 30 shown in FIG. 13 receives the one-frame preceding image data Dp0 and the current image data Di1, and outputs the corrected image data $$Dj1=(Di1,Dp0)$$

in accordance with the values of the both data. Stored in the look-up table 30 are (256×256) items of corrected image data $$Dj1=(Di1,Dp0)$$

obtained by adding the amount of correction $$Dg1=(Di1,Dp0)$$

shown in FIG. 12 to the current image data Di1. In this case, the corrected image data Dj1 is set so as not to exceed a gradation range displayable on the display 11.

Figure 14:
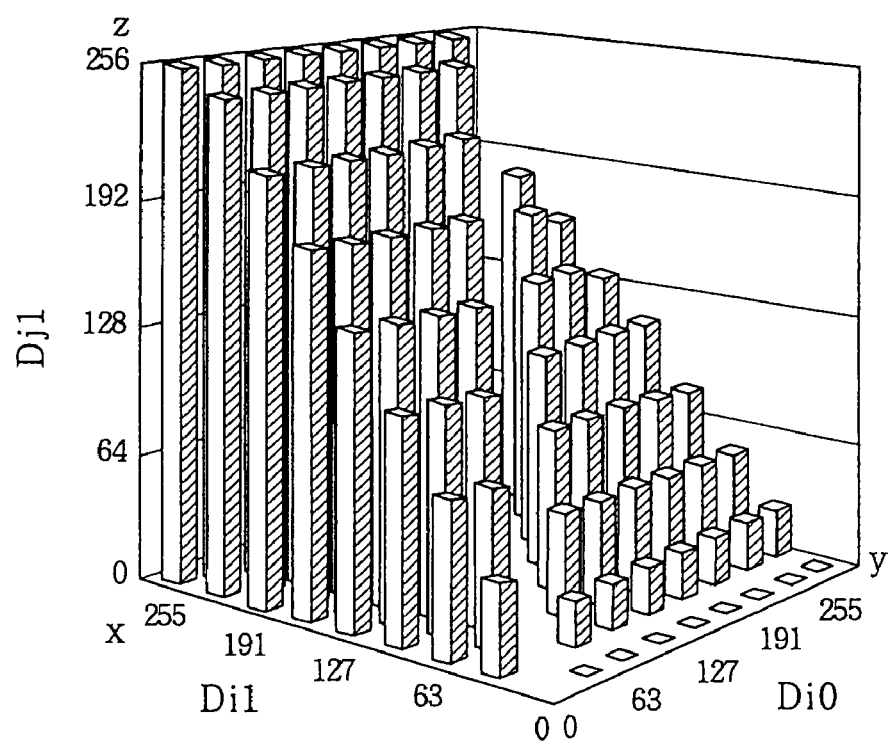
FIG. 14 is a diagram showing an example of corrected image data.

FIG. 14 is a diagram showing an example of the corrected image data Dj1 stored in the look-up table 30. When the gradation value of the current image data has eight bits, there are present (256×256) items of the corrected image data Dj1 corresponding to combinations between the gradation value of the current image data and the gradation value of the one-frame preceding image data. In FIG. 14, only (8×8) amounts of correction corresponding to combinations between the gradation values are illustrated for simplicity.

In this way, when previously-found corrected image data Dj1 are stored in the look-up table 30 and the corresponding corrected image data Dj1 is outputted in accordance with the current image data Di1 and the one-frame preceding image data Dp0, the amount of calculation necessary for outputting the corrected image data Dj1 can be further reduced.

Second Embodiment

Figure 15:
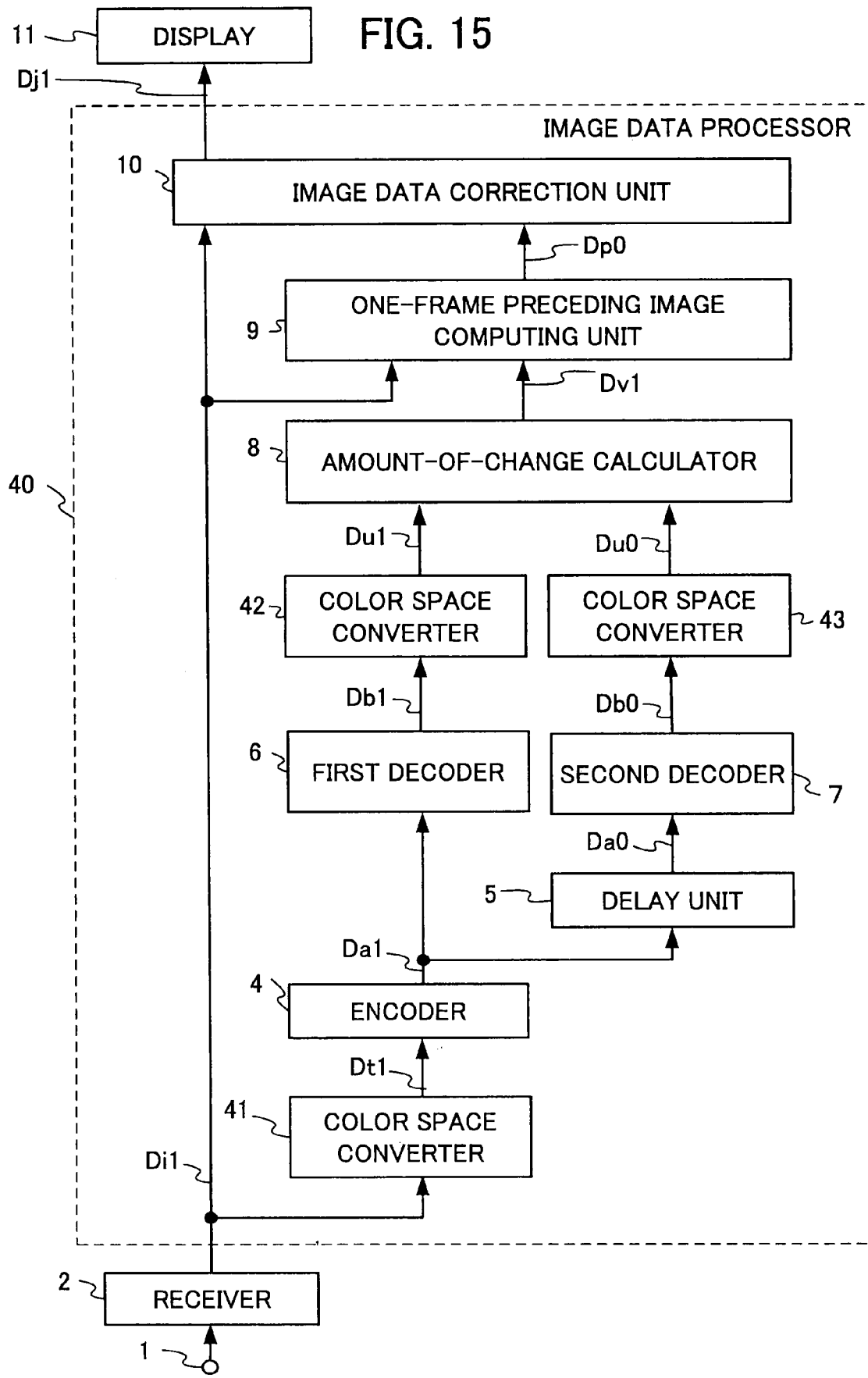
FIG. 15 is a block diagram showing a configuration of an image display device including an image processing device (i.e., an image data processor) according to the second embodiment of the present invention.

FIG. 15 is a block diagram showing a configuration of an image display device including an image data processor 40 which is an image processing device according to the second embodiment of the present invention. In FIG. 15, constituent elements having the same as or corresponding to those in FIG. 1 are assigned the same reference numerals. The image data processor 40 of the second embodiment is different from the image data processor 3 of the aforementioned first embodiment in that the image data processor 40 includes a color space converter 41 at the preceding stage of the encoder 4, a color space converter 42 at the subsequent stage of the first decoder 6, and a color space converter 43 at the subsequent stage of the second decoder 7.

The color space converter 41 converts the current image data Di1 to image data of a brightness signal Y and color signals Cb and Cr, and outputs a converted current image data Dt1. The encoder 4 encodes the current image data Dt1 and outputs the encoded image data Da1 corresponding to the current image data Dt1. The delay unit 5 delays the encoded image data Da1 by a period corresponding to one frame, and outputs an encoded image data Da0 corresponding to an image of a frame preceding the current image by one frame. The first decoder 6 and the second decoder 7 decode the encoded image data Da1 and Da0, and output decoded image data Db1 and Db0 corresponding to the current image.

The color space converters 42 and 43 convert the decoded image data Db1 and Db0 of the brightness and color signals to digital signals of RGB, and output the converted image data Du1 and Du0.

The amount-of-change calculator 8 subtracts the decoded image data Du0 corresponding to the image data of the current frame from the decoded image data Du0 corresponding to the image data of a frame preceding by one frame to calculate the amount of change Dv1 of the gradation value of each pixel between the image of a frame preceding by one frame and the current image. The amount of change Dv1 is inputted to the one-frame preceding image computing unit 9 together with the current image data Di1.

The one-frame preceding image computing unit 9 adds the amount of change Dv1 of the gradation value outputted from the amount-of-change calculator 8 to the current image data Di1, thereby generating the one-frame preceding image data Dp0. The generated one-frame preceding image data Dp0 is inputted to the image data correction unit 10.

The image data correction unit 10 corrects the image data Di1 in accordance with an amount of change in the gradation value in a period of one frame obtained by comparison between the current image data Di1 and the one-frame preceding image data Dp0, in such a manner that transmissivity of the liquid crystal reaches a predetermined level specified by the image data Di1 in a period of one frame, and then outputs the corrected image data Dj1.

The encoder 4 in the second embodiment, in the substantially same way as that in the first embodiment, generates the block image data Dc1 corresponding to each of the divided blocks of the current image data Dt1, and with use of the block image data Dc1, generates the quantized image data Df1 obtained by quantizing the dynamic range data Dd1, the average value data De1, and the block image data Dc1 for each of the divided data blocks. At this time, the block image data Dc1, the dynamic range data Dd1, the average value data De1, and the quantized image data Df1 are each generated with respect to each of the brightness signal Y and the color signals Cb and Cr.

FIGS. 16A, 16B1, 16B2, 16C1, and 16C2 are diagrams showing examples of structures of encoded image data in the second embodiment. FIGS. 16A, 16B1, 16B2, 16C1, and 16C2 shows examples of the dynamic range data Dd1, the average value data De1, and the quantized image data Df1, when the number of pixels per block included in each of the brightness signal Y and the color signals Cb and Cr is eight. In the illustrated examples, a number given in each of rectangles denotes the number of bits in each data.

Figures 16A, 16B1, 16B2, 16C1, 16C2:
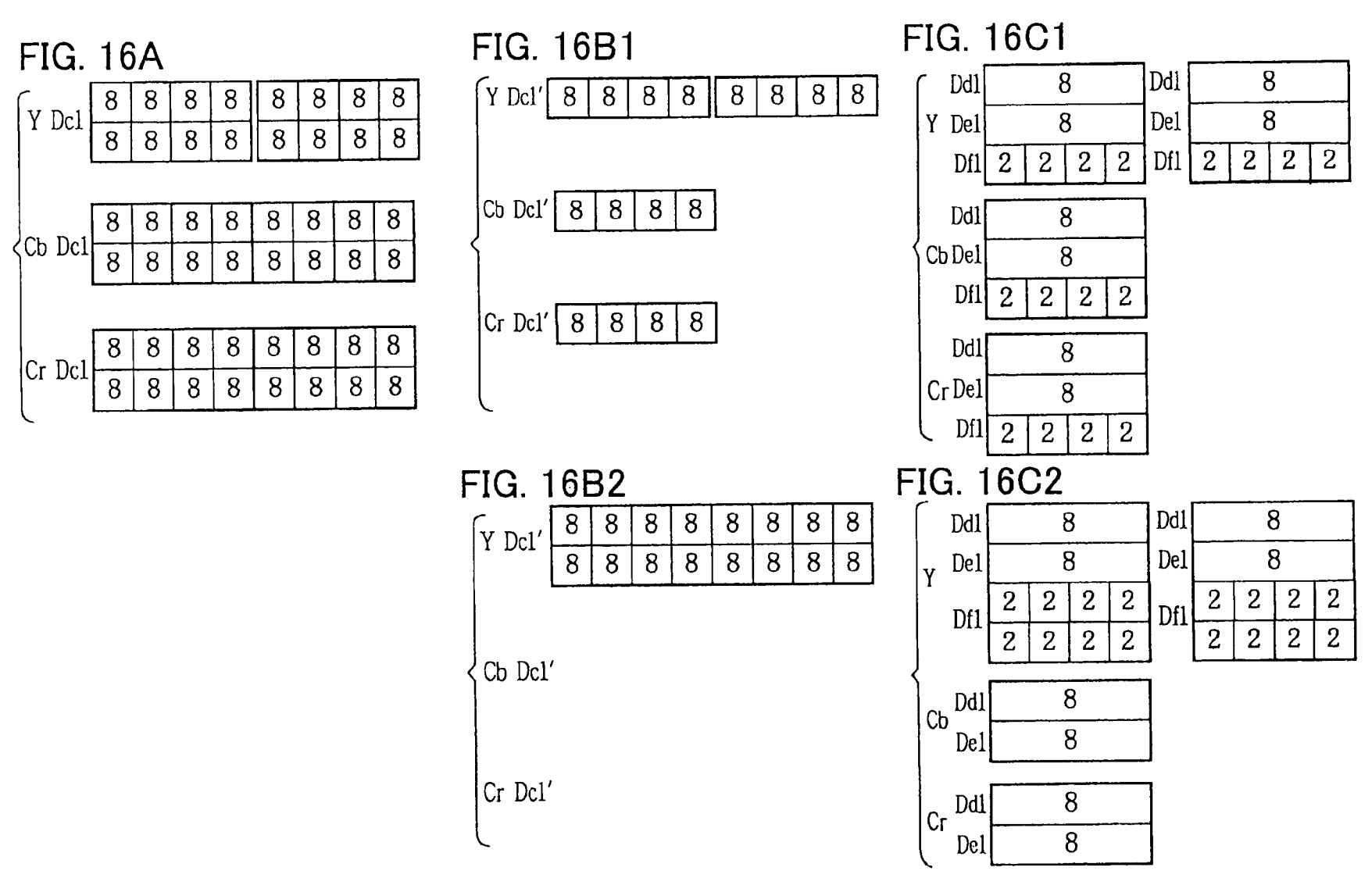

FIG. 16A shows the block image data Dc1 for the brightness signal Y and the color signals Cb and Cr. FIG. 16A indicates that each block has eight pixels, each of which has 8-bit image data.

FIG. 16B1 shows the reduced-number-of-pixel block image data Dc1' when the block image data Dc1 of the brightness signal Y and the color signals Cb and Cr has a reduced number of pixels of four. FIG. 16B2 shows the reduced-number-of-pixel block image data Dc1' when the block image data Dc1 of the brightness signal Y has a reduced number of pixels of zero and when the block image data Dc1 of the color signals Cb and Cr has a reduced number of pixels of six.

FIG. 16C1 shows the encoded image data Da1 obtained when the reduced-number-of-pixel block image data Dc1' shown in FIG. 16B1 is encoded. FIG. 16C2 shows the encoded image data Da1 obtained when the reduced-number-of-pixel block image data Dc1' shown in FIG. 16B2 is encoded. The encoded image data of FIGS. 16C1 and 16C2 have each the dynamic range data Dd1, the average value data De1, and the quantized image data Df1.

In the second embodiment, when data in one block has a small dynamic range, an error generated by decreasing the number of pixels is small. Thus, as shown in FIG. 16B2, the reduction-number of pixels for each of the color signals Cb and Cr is made large and the reduction-number of pixels for the brightness signal Y is made small. Conversely, when the color signals Cb and Cr have each a large dynamic range, as shown in FIG. 16B1, the brightness signal Y and the color signals Cb and Cr are set to have an identical reduction-number of pixels in the second embodiment. In this way, when the reduction-number of pixels for each of the brightness signal Y and the color signals Cb and Cr is adjusted in accordance with the dynamic range of the color signals Cb and Cr, the influence of an error by decreasing the number of pixels can be minimized while keeping the amount of the encoded image data Da1 constant.

As a method of reducing the number of pixels in the number-of-pixel reducing unit 20, any method such as a simple pixel thinning method or a method for outputting an average of values of a plurality of adjacent pixels can be employed so long as the method can reduce the number of pixels.

FIGS. 17A, 17B1, 17B2, 17C1, and 17C2 are diagrams showing another example of structures of encoded image data in the second embodiment. FIGS. 17A, 17B1, 17B2, 17C1, and 17C2 are diagrams showing other examples of the dynamic range data Dd1, the average value data De1, and the quantized image data Df1 in the second embodiment, when the number of pixels included in the brightness signal Y per block is eight and when the number of pixels included in each of the color signals Cb and Cr is sixteen. In the illustrated example, a number given in each of rectangles and squares denotes the number of bits in each data.

Figures 17A, 17B1, 17B2, 17C1, 17C2:
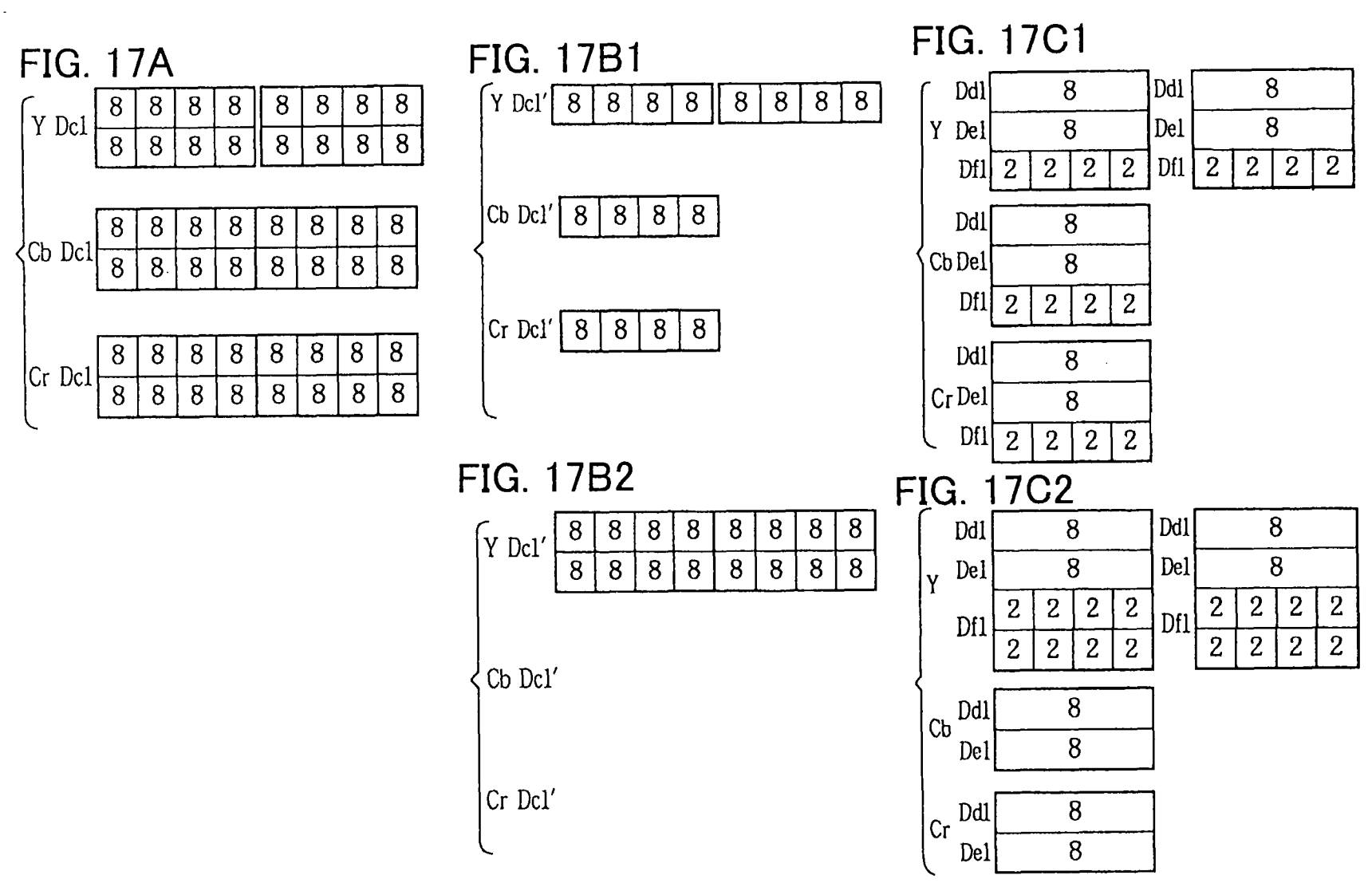

FIG. 17A shows the block image data Dc1 when the brightness signal Y has image data corresponding to two blocks and when each of the color signals Cb and Cr has image data corresponding to one block.

FIG. 17B1 shows the reduced-number-of-pixel block image data Dc1' when the brightness signal Y has reduction-number of pixels of four and when each of the color signals Cb and Cr has reduction-number of pixels of twelve. FIG. 17B2 shows the reduced-number-of-pixel block image data Dc1' when the brightness signal Y has reduction-number of pixels of zero and each of the color signals Cb and Cr has reduction-number of pixels of sixteen.

FIG. 17C1 shows the encoded image data Da1 obtained when the reduced-number-of-pixel block image data Dc1' shown in FIG. 17B1 is encoded. FIG. 17C2 shows the encoded image data Da1 obtained when the reduced-number-of-pixel block image data Dc1' shown in FIG. 17B2 is encoded. Each of the encoded image data of FIGS. 17C1 and 17C2 includes the dynamic range data Dd1, the average value data De1, and the quantized image data Df1.

In the examples of FIGS. 17A, 17B1, 17B2, 17C1, and 17C2, the brightness signal Y and the color signals Cb and Cr have different numbers of pixels included in one block, and the number of pixels corresponding to two blocks for the brightness signal Y is equal to the number of pixels included in one block for the color signals Cb and Cr.

When data in one block has a small dynamic range, an error generated by decreasing the number of pixels is small. In the example of FIGS. 17A to 17C2, therefore, when the color signals Cb and Cr have both a small dynamic range, the number-of-pixel reducing unit 20 increases the reduction-number of pixels until the number of pixels for the color signals Cb and Cr becomes zero, and the reduction-number of pixels of the brightness signal Y becomes zero as shown in FIG. 17B2.

Conversely, when any one of the color signals Cb and Cr has a large dynamic range, the reduction-number of pixels of the brightness signal Y is set at four and the reduction-number of pixels of the color signals Cb and Cr is set at twelve as shown in FIG. 17B1. In this way, the reduction-number of pixels is adjusted not only with use of a pair of block image data of the brightness signal Y and the color signals Cb and Cr as in the example of FIGS. 16A to 16C2, but the reduction-number of pixels may also be adjusted with use of block image data of a plurality of blocks. That is, any combination between the reduction-number of pixels can be employed so long as the combination can provide a constant amount for the encoded image data Da1.

When the reduction-number of pixels is set to be equal to the number of pixels included in one block as in the example of FIGS. 17A to 17C2, the number of pixels of the reduced-number-of-pixel block image data Dc1' can be set at zero and the encoded image data Da1 can have the dynamic range data Dd1 and the average value data De1 alone.

According to the image processing device of the second embodiment described above, when the dynamic range of the color signals Cb and Cr is small, the reduction-number of pixels of the brightness signal Y can be controllably reduced simultaneously with the increased reduction-number of pixels of the color signals Cb and Cr. As a result, an encoding error generated by reducing the number of pixels can be reduced and the amount of encoded image data can be kept constant.

Further, when the dynamic range of the color signals Cb and Cr is small, the reduction-number of pixels of the brightness signal Y is controllably reduced simultaneously with the increased reduction-number of pixels of the color signals Cb and Cr and therefore an encoding error when the number of pixels is reduced is made to be small. Thus, even when a compression rate is increased, the corrected image data Dj1 can be created with a small error. In other words, even when image data is reduced by encoding, the response time of the liquid crystal can be suitably controlled while avoiding application of an unwanted overvoltage caused by the encoding error, thus enabling reduction of the capacity of the frame memory of the delay unit 5 necessary for delaying the encoded image data Da1.

Third Embodiment

Figure 18:
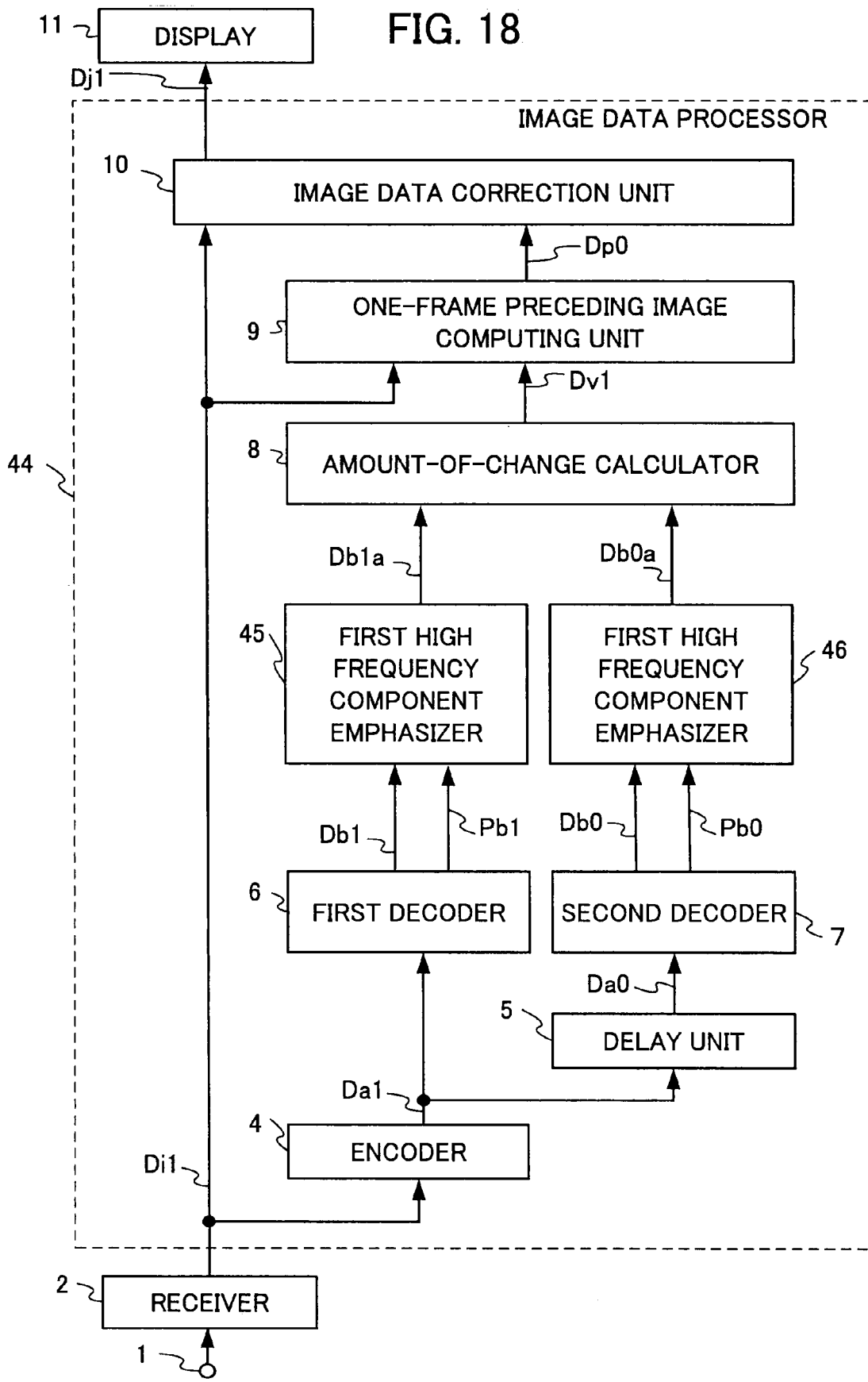
FIG. 18 is a block diagram showing an exemplary configuration of an image processing device according to the third embodiment.

FIG. 18 is a block diagram showing a configuration of a liquid crystal display device including an image data processor 44 which is an image processing device according to the third embodiment of the present invention. In FIG. 18, constituent elements having the same as or corresponding to those in FIG. 1 are assigned the same reference numerals. The image data processor 44 of the image data processor 3 is different from the image data processor 3 of the first embodiment shown in FIG. 1, in that a first high frequency component emphasizer 45 is provided at the subsequent stage of the first decoder 6, a second high frequency component emphasizer 46 is provided at the subsequent stage of the second decoder 7, the decoded image data Db1 and the encoding parameter pb1 are inputted to the first high frequency component emphasizer 45 from the first decoder 6, the decoded image data Db0 and the encoding parameter Pb0 are outputted from the second decoder 7 to the second high frequency component emphasizer 46, and the amount-of-change calculator 8 calculates a difference between an output Db1$a$ of the first high frequency component emphasizer 45 and an output Db0$a$ of the second high frequency component emphasizer 46.

Figure 19:
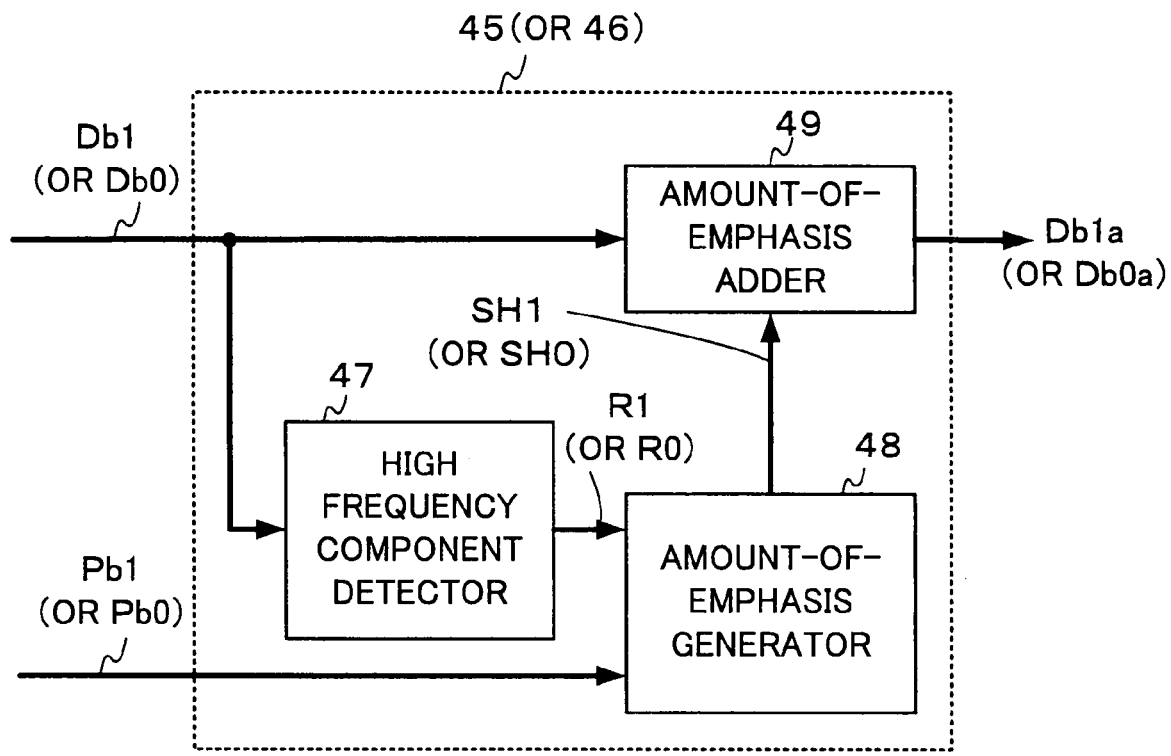
FIG. 19 is a diagram showing an internal configuration of a high frequency component emphasizer in the third embodiment.

FIG. 19 is a block diagram showing an internal configuration of the first high frequency component emphasizer 45 (or the second high frequency component emphasizer 46). In the third embodiment, the first high frequency component emphasizer 45 and the second high frequency component emphasizer 46 have the same constituent elements and function. As shown in FIG. 19, the first high frequency component emphasizer 45 (or the second high frequency component emphasizer 46) has a high frequency component detector 47, an amount-of-emphasis generator 48, and an amount-of-emphasis adder 49.

The high frequency component detector 47, which has a band pass filter (BPF) or the like, extracts high frequency components included in the first decoded image data Db1 (or the second decoded image data Db0), and outputs a high frequency component signal R1 (or R0).

Figure 20:
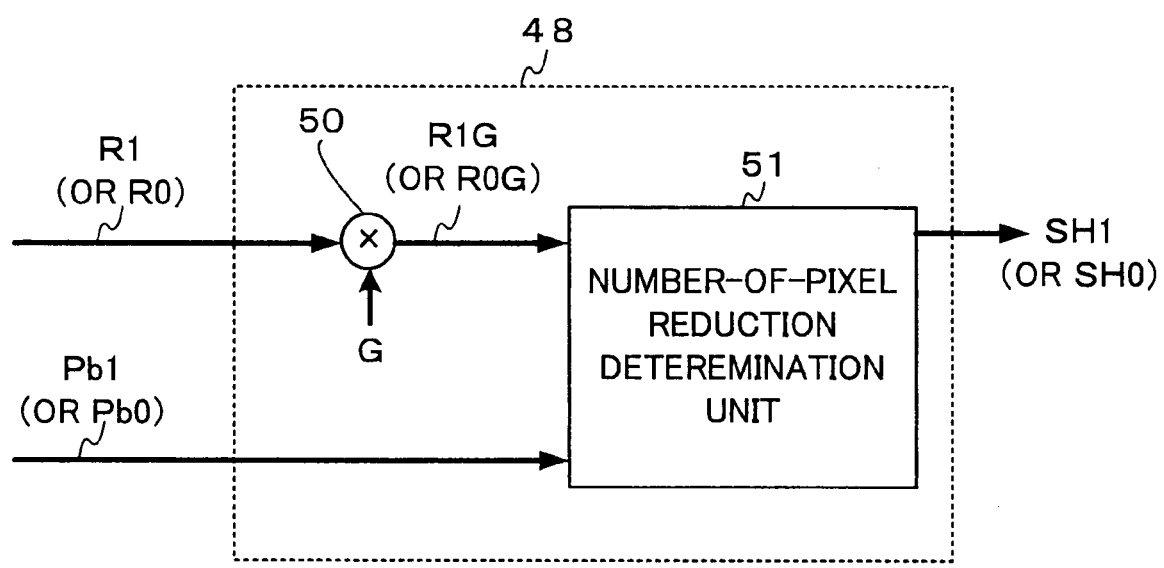
FIG. 20 is a diagram showing an internal configuration of an amount-of-emphasis generator in the third embodiment.

The amount-of-emphasis generator 48 outputs an emphasis signal SH1 (or SH0) based on the high frequency component signal R1 (or R0), a predetermined gain G, and the encoding parameter Pb1 (or Pb0) outputted from the first decoder 6 (or the second decoder 7). FIG. 20 is a block diagram showing an internal configuration of the amount-of-emphasis generator 48. As shown in FIG. 20, the amount-of-emphasis generator 48 has a multiplier 50 for multiplying the high frequency component signal R1 (or R0) by the predetermined gain G and outputting the multiplied result as a high frequency component signal R1G (or R0G), and a number-of-pixel reduction determination unit 51 for receiving the high frequency component signal R1G (or R0G) from the multiplier 50 and the encoding parameter Pb1 (or Pb0). The encoder 4 of the number-of-pixel reduction determination unit 51 determines whether or not the number of pixels of the image data is reduced in accordance with the encoding parameter Pb1 (or Pb0). When determining that the number of pixels is reduced, the number-of-pixel reduction determination unit 51 inverts the high frequency component signal R1G (or R0G), multiplies it by an arbitrary gain coefficient to obtain the emphasis signal SH1 (or SH0), and outputs the emphasis signal SH1 (or SH0). When determining that the number of pixels is not reduced, the number-of-pixel reduction determination unit 51 outputs "0" as the emphasis signal SH1 (or SH0).

The amount-of-emphasis adder 49 adds the emphasis signal SH1 (or SH0) outputted from the amount-of-emphasis generator 48 to the first decoded image data Db1 (or the second decoded image data Db0), and outputs the first decoded image data Db1$a$ (or the second decoded image data Db0$a$), high frequency components of which is emphasized. Other elements other than the aforementioned constituent elements in the elements of FIG. 18 have the substantially same configuration and function as those of the corresponding constituent elements already described in the first embodiment.

Figure 21A:
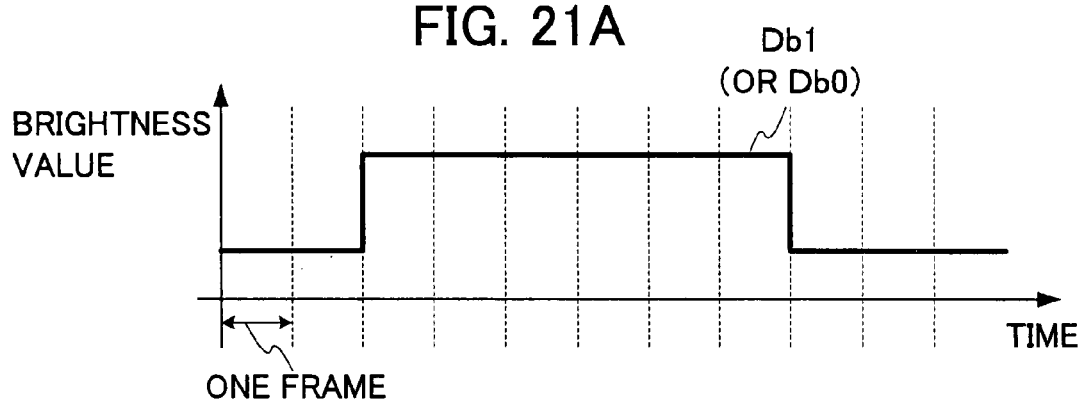
FIGS. 21A and 21B are diagrams showing influence caused by reducing number of pixels of encoded image data.
Figure 21B:
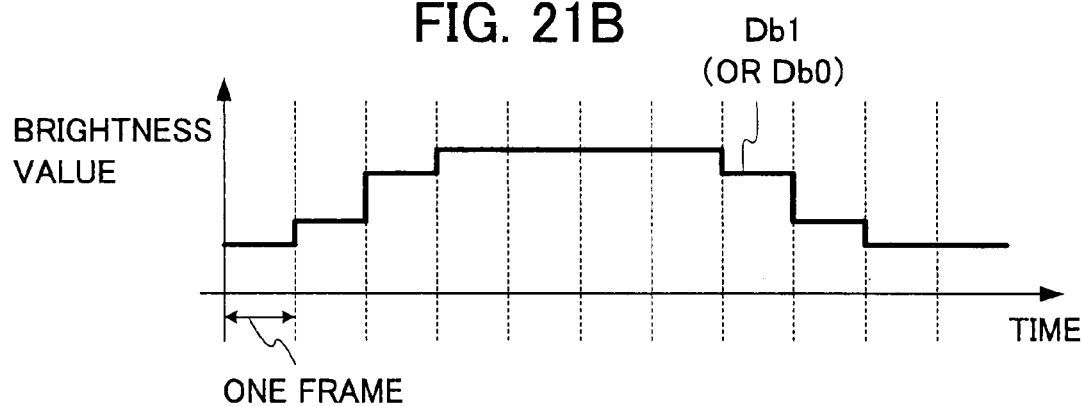

Explanation will next be made as to operation of the image data processor 44 shown in FIG. 18. FIGS. 21A and 21B are diagrams showing data after decoded of the image data processor 44, wherein FIG. 21A shows a case where the number of pixels is not reduced in the encoder 4, and FIG. 21B shows a case where the number of pixels is reduced in the encoder 4. In FIGS. 21A and 21B, a vertical axis denotes a brightness value of a pixel and a horizontal axis denotes time. FIGS. 21A and 21B show cases where an image is shifted by one pixel for a period of one frame. There are some methods for decreasing the number of pixels such as a pixel thinning method for reducing the number of pixels by removing pixels and a method for reducing the number of pixels by replacing a plurality of adjacent pixels by a pixel having data obtained through averaging operation of the plurality of pixels. FIG. 21B shows a case where the number of pixels is reduced by the averaging operation, in which a new halftone pixel is generated at an edge part having brightness initially abruptly changed (as shown in FIG. 21A) through the averaging operation. Such a complemented edge having the halftone is moved, an amount of change shown in FIG. 21B is observed when a pixel is compared between frames.

Figure 22A:
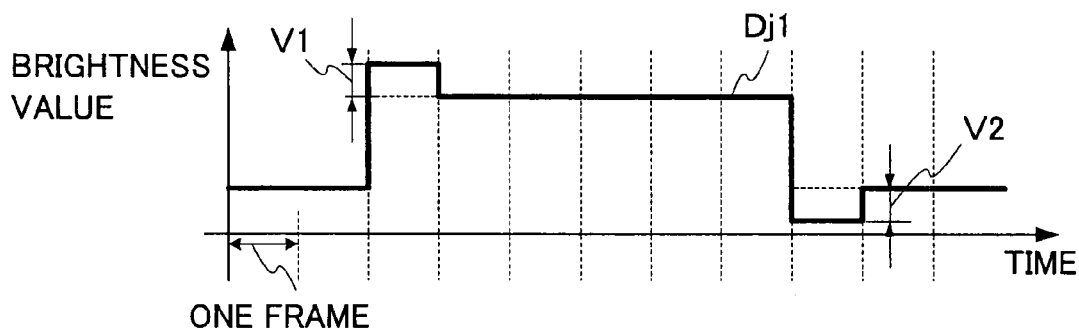
FIGS. 22A and 22B are diagrams showing influence caused by reducing number of pixels of encoded image data.
Figure 22B:
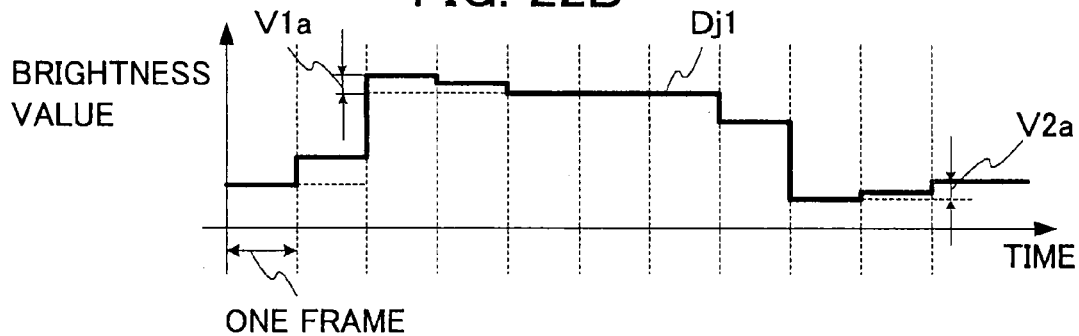

FIGS. 22A and 22B are diagrams showing a problem possibly generated when the high frequency component emphasizing function of the first high frequency component emphasizer 45 and the second high frequency component emphasizer 46 is disabled in the third embodiment. FIGS. 22A and 22B show the corrected image data Dj1 outputted from the image data processor 44, wherein FIG. 22A shows a case where the number of pixels is not reduced in the encoder 4 and FIG. 22B shows a case where the number of pixels is reduced in the encoder 4. FIGS. 22A and 22B correspond to FIGS. 21A and 21B respectively. FIG. 22A shows data obtained, when the brightness value is increased than that of the previous frame in comparison between consecutive two frames in FIG. 21A, by increasing the brightness value by a value corresponding to the increase; whereas, when the brightness value is decreased than that of the previous frame in comparison between consecutive two frames in FIG. 21A, by decreasing the brightness value by a value corresponding to the decrease. FIG. 22B shows data obtained, when the brightness value is increased than that of the previous frame in comparison between consecutive two frames in FIG. 21B, by increasing the brightness value by a value corresponding to the increase; whereas, when the brightness value is decreased than that of the previous frame in comparison between consecutive two frames in FIG. 21B, by decreasing the brightness value by a value corresponding to the decrease. As shown in FIG. 22A, when the number of pixels is not reduced in the encoder 4, the amplitudes of the amounts of correction V1 and V2 added to the corrected image data are large. As shown in FIG. 22B, however, when the number of pixels is reduced in the encoder 4, the amplitudes of the amounts of correction V1$a$ and V2$a$ are small and the brightness value is varied throughout a long time (i.e., the brightness value in FIG. 22B is varied in a wide range). For this reason, only when the number of pixels is reduced, the effect of improving the response time of the liquid crystal may be possibly reduced.

Figure 23A:
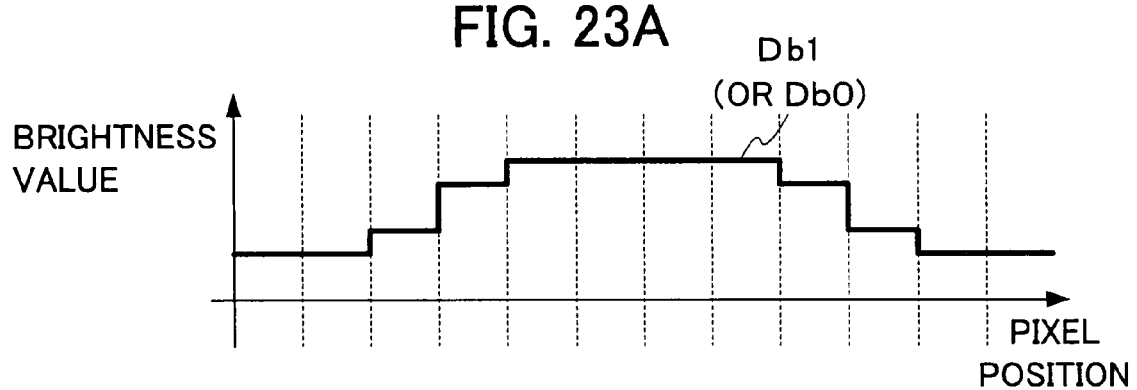
FIGS. 23A to 23D are diagrams showing operation of the high frequency component emphasizer in the third embodiment.
Figure 23B:
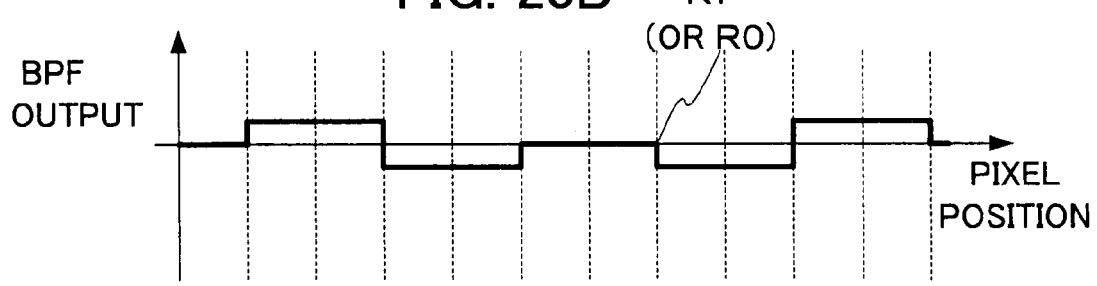

FIGS. 23A to 23D are diagrams showing operation of the first high frequency component emphasizer 45 and the second high frequency component emphasizer 46. For the simplicity of explanation, FIG. 23A shows, as an example, an amount of change in the signal when the decoded image data Db1 (or Db0) shown in FIG. 21B is shifted by one pixel for each frame. FIG. 23B shows the high frequency component signal R1 (or R0) as an output signal after the decoded image data Db1 shown in FIG. 23A is processed (quadratic differential operation) by an arbitrary band pass filter (BPF) in the high frequency component detector 47. Assuming that Y(n) denotes a brightness value at the position of the n-th pixel, then the output of the BPF is expressed, for example, as $$2Y(n)-\{Y(n-1)+Y(n+1)\}.$$

Figure 23C:
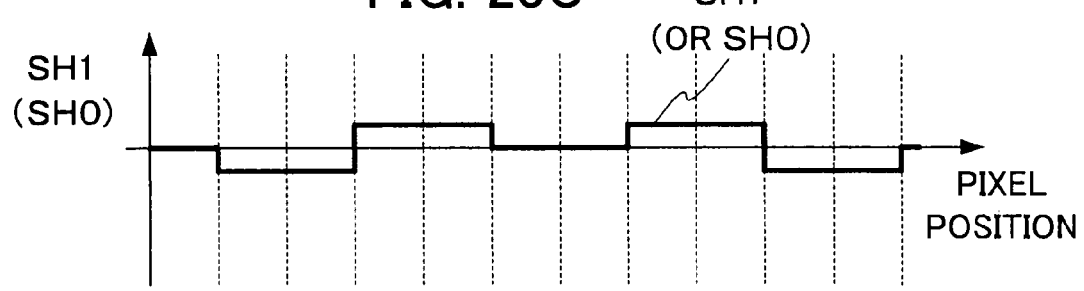
Figure 23D:
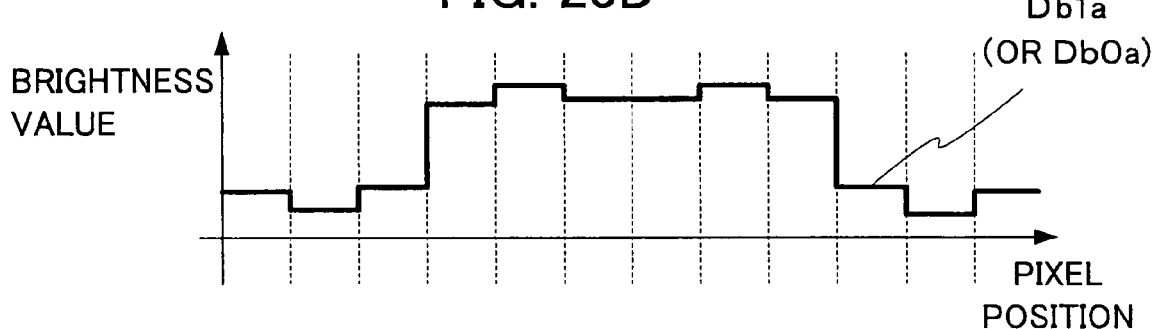

FIG. 23C is obtained by inverting FIG. 23B and multiplying the inverted result by a coefficient. FIG. 23D shows the first decoded image data Db1$a$ (or the second decoded image data Db0$a$) generated by adding the emphasis signal SH1 (or SH0) generated by sign-inverting the high frequency component signal R1 (or R0) in the amount-of-emphasis generator 48, to the first decoded image data Db1 (or the second decoded image data Db0) in the amount-of-emphasis adder 49.

Figure 24A:
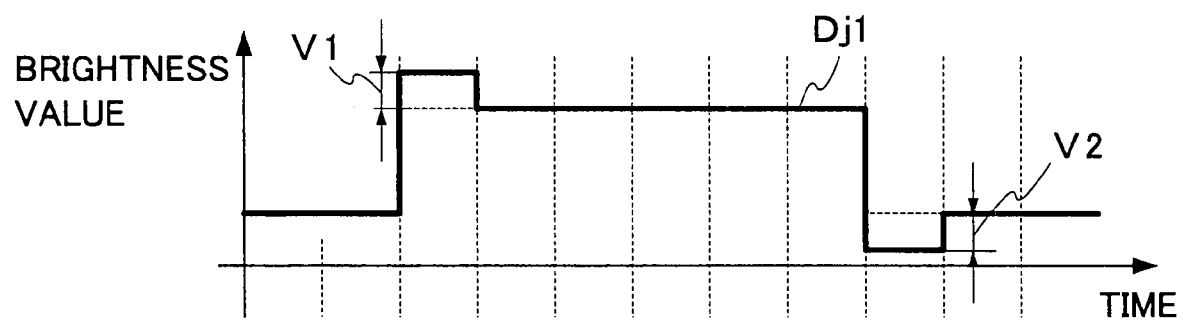
FIGS. 24A and 24B are diagrams showing correction data used in high frequency component emphasis process.
Figure 24B:
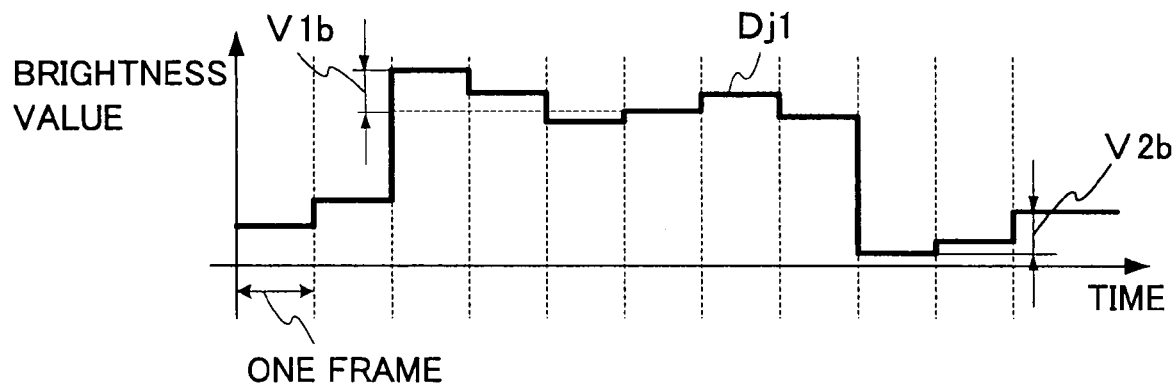

FIGS. 24A and 24B are diagrams showing the corrected image data Dj1 outputted from the image data processor 44 when the high frequency component emphasizing function of the first high frequency component emphasizer 45 and the second high frequency component emphasizer 46 is enabled in the image data processor 3, wherein FIG. 24A show a case where the number of pixels is not reduced in the encoder 4 and FIG. 24B show a case where the number of pixels is reduced in the encoder 4. FIG. 24A and FIG. 24B correspond to FIG. 21A and FIG. 23D respectively. FIG. 24A is obtained, when the brightness value is increased than that of the previous frame in comparison between consecutive two frames in FIG. 21A, by increasing the brightness value by a value corresponding to the increase; whereas, when the brightness value is decreased than that of the previous frame in comparison between consecutive two frames in FIG. 21A, by decreasing the brightness value by a value corresponding to the decrease. FIG. 24B is obtained, when the brightness value is increased than that of the previous frame in comparison between consecutive two frames in FIG. 23D, by increasing the brightness value by a value corresponding to the increase; whereas, when the brightness value is decreased than that of the previous frame in comparison between consecutive two frames in FIG. 23D, by decreasing the brightness value by a value corresponding to the decrease. As shown in FIG. 24B, even when the number of pixels is reduced in the encoder 4, the amplitudes of the amounts of correction V1b and V2b are large. Thus, even when the number of pixels is reduced, the effect of improving the response time of the liquid crystal can be sufficiently obtained.

When the number of increased or decreased pixels varies from pixel position to pixel position, the emphasizing operation of high frequency components in the entire display area causes the different amount of correction to be generated with different signals or different pixel positions, which possibly leads to degradation of a picture quality such as flickering display screen. In the image processing device of the third embodiment, however, the emphasis signal SH1 (or SH0) is controlled by the number-of-pixel reduction determination unit 51 in accordance with the encoding parameter Pb1 (or Pb0) outputted from the first decoder 6 (or the second decoder 7). Thus, high frequency components are emphasized when the number of pixels is reduced and the decoded image data Db1 (or Db0) is outputted as it is as data Db1a (or Db0a) when the number of pixels is not reduced. As a result, even when the number of decreased pixels varies from pixel position to pixel position, a constant amount of correction can be provided uniformly throughout the entire display.

According to the image processing device of the third embodiment mentioned above, high frequency components which are reduced when the number of pixels is reduced and then encoded are emphasized after the decoding. Therefore, even when the decreased number of pixels causes an increased compression rate, the corrected image data Dj1 having less error can be generated even for a signal in a high frequency area. In other words, even when the number of pixels is decreased, a sufficient overvoltage can be applied to the high frequency area of an image.

Figure 25:
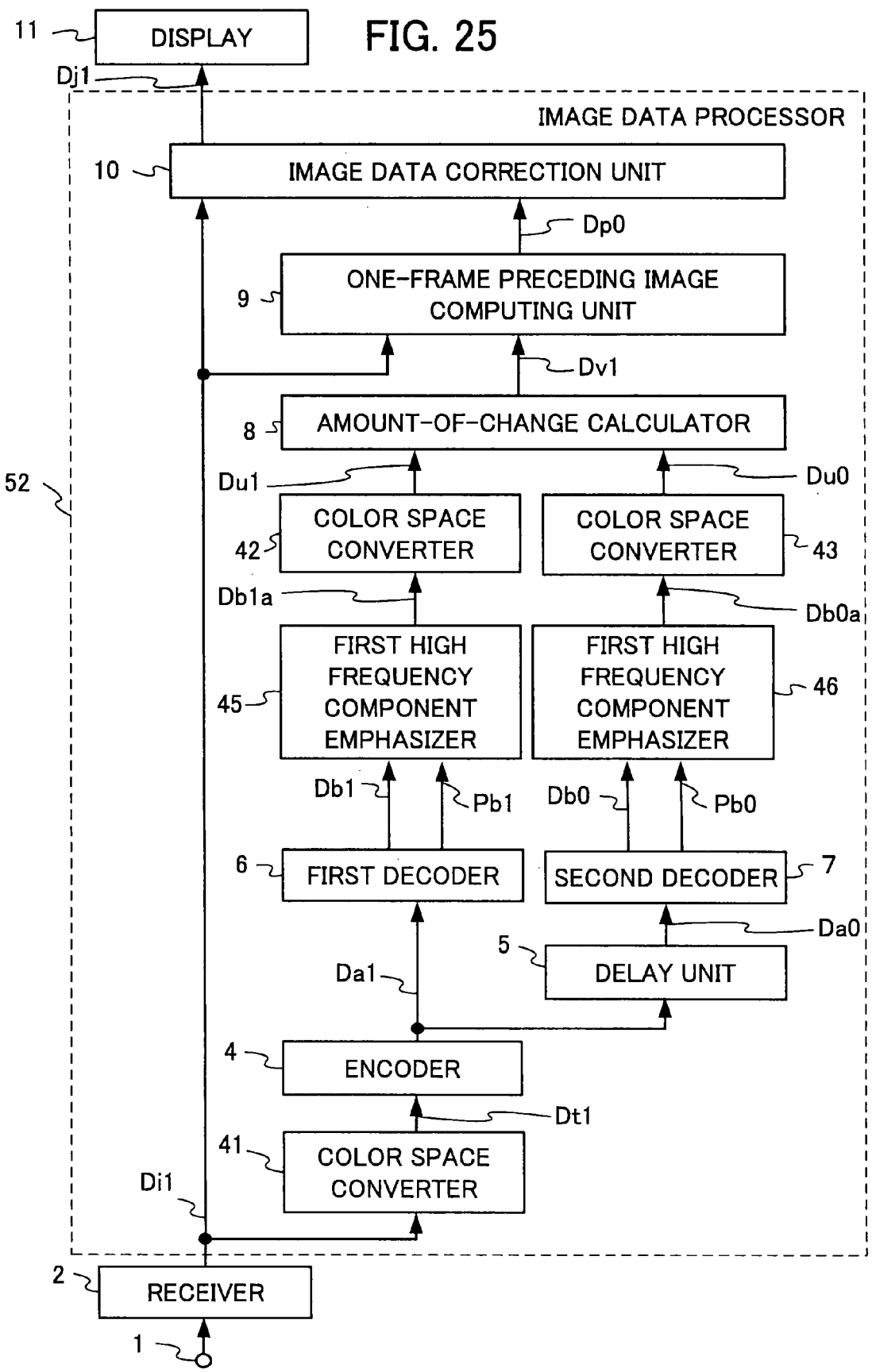
FIG. 25 is a block diagram showing another exemplary configuration of the image processing device according to the third embodiment.

The contents already described above can hold true even when an image data processor 52 includes the color space converter 41 provided at the previous stage of the encoder 4 and the color space converters 42 and 43 provided at the subsequent stage of the first and second high frequency component emphasizers 45 and 46, as shown in FIG. 25. In FIG. 25, constituent elements that are the same as or corresponding to those in FIG. 15 are denoted by the same reference numerals. The image data processor 40 of the third embodiment is effective when the number of decreased pixels varies with the different brightness signals and different color differential signals as shown in the above second embodiment.

What is claimed is:
1. An image processing device comprising:
an encoder which encodes input image data of a current frame to obtain encoded image data and outputs the encoded image data, the encoder comprising:
an image data blocking unit which divides image data of a current frame into a plurality of blocks to obtain block image data, thereby outputting the block image data;
a dynamic range generator which finds a dynamic range of the block image data, thereby outputting dynamic range data indicative of the dynamic range;
an average value generator which calculates an average value of the block image data, thereby outputting average value data indicative of the average value of the block image data;
a number-of-pixel reducing unit which receives reduction-number of pixels and reduces number of pixels of the block image data by the reduction-number of pixels, thereby generating reduced-number-of-pixel block image data;
an encoding parameter generator which generates an encoding parameter specifying a quantization bit rate and the reduction-number of pixels in accordance with the dynamic range data;
a quantization threshold generator which generates a quantization threshold value in accordance with the dynamic range data, the average value data, and the encoding parameter;
an image data quantizer which quantizes the reduced-number-of-pixel block image data with use of the quantization threshold value, thereby generating quantized image data for displaying an image on a display based on the quantized image data; and
an encoding data synthesizer which combines the dynamic range data, the average value data, and the quantized image data to obtain encoded image data, thereby outputting the encoded image data;
a first decoder which decodes the encoded image data to obtain first decoded image data corresponding to the image data of the current frame, thereby outputting the first decoded image data;
a delay unit which delays the encoded image data by a period corresponding to one frame;
a second decoder which decodes the encoded image data outputted from the delay unit to obtain second decoded image data corresponding to image data of a frame preceding the current frame by one frame, thereby outputting the second decoded image data;
an amount-of-change calculator which calculates an amount of change in each pixel between the first decoded image data and the second decoded image data;
a one-frame preceding image computing unit which calculates reproduction image data corresponding to the one-frame preceding image data with use of the amount of change and the image data of the current frame;
an image data correction unit which corrects a gradation value of the image data of the current frame in accordance with the image data of the current frame and the reproduction image data;
a first color space converter which converts the input image data of the current frame into image data of a brightness signal and image data of a color signal, thereby outputting the image data of the brightness signal and the image data of the color signal to the encoder;
a second color space converter which converts the image data of the brightness signal corresponding to the current frame and the image data of the color signal corresponding to the current frame, both of which are outputted from the first decoder, into image data corresponding to the current frame, thereby outputting the converted image data of the current frame to the amount-of-change calculator; and a third color space converter which converts the image data of the brightness signal corresponding to the frame preceding the current frame by one frame and the image data of the color signal corresponding to the frame preceding the current frame by one frame, both of which are outputted from the second decoder, into image data corresponding to the frame preceding the current frame by one frame, thereby outputting the converted image data corresponding to the frame preceding the current frame by one frame to the amount-of-change calculator, wherein the encoding parameter generator in the encoder generates reduction-number of pixels in such a manner that the encoding parameter generator increases the reduction-number of pixels for the color signal of each block in the image data of the current frame with decrease of the dynamic range of the image data of the color signal of each block in the image data of the current frame.

2. An image processing device comprising:

an encoder which encodes input image data of a current frame to obtain encoded image data and outputs the encoded image data, the encoder comprising:

an image data blocking unit which divides image data of a current frame into a plurality of blocks to obtain block image data, thereby outputting the block image data;

a dynamic range generator which finds a dynamic range of the block image data, thereby outputting dynamic range data indicative of the dynamic range;

an average value generator which calculates an average value of the block image data, thereby outputting average value data indicative of the average value of the block image data;

a number-of-pixel reducing unit which receives reduction-number of pixels and reduces number of pixels of the block image data by the reduction-number of pixels, thereby generating reduced-number-of-pixel block image data;

an encoding parameter generator which generates an encoding parameter specifying a quantization bit rate and the reduction-number of pixels in accordance with the dynamic range data;

a quantization threshold generator which generates a quantization threshold value in accordance with the dynamic range data, the average value data, and the encoding parameter;

an image data quantizer which quantizes the reduced-number-of-pixel block image data with use of the quantization threshold value, thereby generating quantized image data for displaying an image on a display based on the quantized image data; and an encoding data synthesizer which combines the dynamic range data, the average value data, and the quantized image data to obtain encoded image data, thereby outputting the encoded image data;

a first decoder which decodes the encoded image data to obtain first decoded image data corresponding to the image data of the current frame, thereby outputting the first decoded image data;

a delay unit which delays the encoded image data by a period corresponding to one frame;

a second decoder which decodes the encoded image data outputted from the delay unit to obtain second decoded image data corresponding to image data of a frame preceding the current frame by one frame, thereby outputting the second decoded image data;

an amount-of-change calculator which calculates an amount of change in each pixel between the first decoded image data and the second decoded image data;

a one-frame preceding image computing unit which calculates reproduction image data corresponding to the one-frame preceding image data with use of the amount of change and the image data of the current frame;

an image data correction unit which corrects a gradation value of the image data of the current frame in accordance with the image data of the current frame and the reproduction image data;

a first color space converter which converts the input image data of the current frame into image data of a brightness signal and image data of a color signal, thereby outputting the image data of the brightness signal and the image data of the color signal to the encoder;

a second color space converter which converts the image data of the brightness signal corresponding to the current frame and the image data of the color signal corresponding to the current frame, both of which are outputted from the first decoder, into image data corresponding to the current frame, thereby outputting the converted image data of the current frame to the amount-of-change calculator; and a third color space converter which converts the image data of the brightness signal corresponding to the frame preceding the current frame by one frame and the image data of the color signal corresponding to the frame preceding the current frame by one frame, both of which are outputted from the second decoder, into image data corresponding to the frame preceding the current frame by one frame, thereby outputting the converted image data corresponding to the frame preceding the current frame by one frame to the amount-of-change calculator, wherein the encoding parameter generator in the encoder generates reduction-number of pixels in such a manner that the encoding parameter generator increases the reduction-number of pixels for the brightness signal of each block in the image data of the current frame with increase of the dynamic range of the image data of the color signal of each block in the image data of the current frame.

3. An image processing method comprising the steps of:

converting the input image data of the current frame into image data of a brightness signal and image data of a color signal;

encoding the image data of the brightness signal and the image data of the color signal by the following image encoding method, thereby outputting encoded image data;

dividing image data of a current frame into a plurality of blocks to obtain block image data, thereby outputting the block image data;

finding a dynamic range of the block image data, thereby outputting dynamic range data indicative of the dynamic range;

calculating an average value of the block image data, thereby outputting average value data indicative of the average value of the block image data;

generating an encoding parameter specifying a quantization bit rate and reduction-number of pixels in accordance with the dynamic range data;

reducing number of pixels of the block image data by the reduction-number of pixels, thereby generating reduced-number-of-pixel block image data;

generating a quantization threshold value in accordance with the dynamic range data, the average value data, and the encoding parameter;
quantizing the reduced-number-of-pixel block image data with use of the quantization threshold value, thereby generating quantized image data; and
displaying, by utilizing a display, an image based on the quantized image data; wherein
the reducing of the number of pixels includes any of processing of pixel thinning and processing of regarding an average value of values of a plurality of adjacent pixels as data of one pixel;
decoding the encoded image data to obtain first decoded image data corresponding to the image data of the brightness signal and to the image data of the color signal, thereby outputting the first decoded image data;
converting the image data of the brightness signal and the image data of the color signal as the first decoded image data into image data corresponding to the current frame;
delaying the encoded image data by a period corresponding to one frame;
decoding the delayed encoded image data to obtain second decoded image data corresponding to image data of a frame preceding the current frame by one frame, thereby outputting the second decoded image data; and
converting the image data of the brightness signal and the image data of the color signal as the second decoded image data into image data corresponding to a frame preceding the current frame by one frame; and
generating reduction-number of pixels in such a manner that the reduction-number of pixels for the color signal of each block in the image data of the current frame is increased, with decrease of the dynamic range of the image data of the color signal of each block in the image data of the current frame.

4. An image processing method comprising the steps of:
converting the input image data of the current frame into image data of a brightness signal and image data of a color signal;
encoding the image data of the brightness signal and the image data of the color signal by the following image encoding method, thereby outputting encoded image data;
dividing image data of a current frame into a plurality of blocks to obtain block image data, thereby outputting the block image data;
finding a dynamic range of the block image data, thereby outputting dynamic range data indicative of the dynamic range;
calculating an average value of the block image data, thereby outputting average value data indicative of the average value of the block image data;
generating an encoding parameter specifying a quantization bit rate and reduction-number of pixels in accordance with the dynamic range data;
reducing number of pixels of the block image data by the reduction-number of pixels, thereby generating reduced-number-of-pixel block image data;
generating a quantization threshold value in accordance with the dynamic range data, the average value data, and the encoding parameter;
quantizing the reduced-number-of-pixel block image data with use of the quantization threshold value, thereby generating quantized image data; and
displaying, by utilizing a display, an image based on the quantized image data; wherein
the reducing of the number of pixels includes any of processing of pixel thinning and processing of regarding an average value of values of a plurality of adjacent pixels as data of one pixel;
decoding the encoded image data to obtain first decoded image data corresponding to the image data of the brightness signal and to the image data of the color signal, thereby outputting the first decoded image data;
converting the image data of the brightness signal and the image data of the color signal as the first decoded image data into image data corresponding to the current frame;
delaying the encoded image data by a period corresponding to one frame;
decoding the delayed encoded image data to obtain second decoded image data corresponding to image data of a frame preceding the current frame by one frame, thereby outputting the second decoded image data; and
converting the image data of the brightness signal and the image data of the color signal as the second decoded image data into image data corresponding to a frame preceding the current frame by one frame; and
generating reduction-number of pixels in such a manner that the reduction-number of pixels for the brightness signal of each block in the image data of the current frame is increased, with increase of the dynamic range of the image data of the color signal of each block in the image data of the current frame.

5. An image processing device which corrects image data indicative of a gradation value of each pixel of an image corresponding to a voltage applied to a liquid crystal in accordance with an amount of change in the gradation value of each pixel and outputs the corrected image data, comprising:
an encoder which quantizes image data of a current frame on a block-by-block basis to obtain encoded image data corresponding to the image of the current frame, thereby outputting the encoded image data;
a first decoder which decodes the encoded image data outputted from the encoder to obtain first decoded image data corresponding to the image data of the current frame, thereby outputting the first decoded image data;
a delay unit which delays the encoded image data outputted from the encoder by a period corresponding to one frame;
a second decoder which decodes the encoded image data outputted from the delay unit to obtain second decoded image data corresponding to image data of a frame preceding the current frame by one frame, thereby outputting the second decoded image data;
a first high frequency component emphasizer which emphasizes high frequency components of the first decoded image data;
a second high frequency component emphasizer which emphasizes high frequency components of the second decoded image data;
an amount-of-change calculator which calculates an amount of change in each pixel between image data, high frequency component of which is emphasized by the first high frequency component emphasizer, and image data, high frequency component of which is emphasized by the second high frequency component emphasizer;
a one-frame preceding image computing unit which calculates reproduction image data corresponding to the one-frame preceding image data with use of the amount of change and the image data of the current frame; and a correction unit which corrects a gradation value of the image data of the current frame in accordance with the image data of the current frame and the reproduction image data;

wherein the encoder includes a number-of-pixel reducing unit which reduces number of pixels of image data of each block in the image data of the current frame and adjusts reduction-number of pixels of the image data of the current frame in each block in accordance with the dynamic range of the image data of the current frame in each block for displaying an image on a display based on the dynamic range of the image data.

6. The image processing device according to claim 5, wherein the first high frequency component emphasizer and the second high frequency component emphasizer emphasize high frequency components when the number of pixels of the image data is reduced in the encoder.

7. The image processing device according to claim 5, wherein correction of the gradation value by the correction unit is carried out so that, upon comparison between the image data of the current frame and the reproduction image data, when the brightness value of the current frame is increased to be higher than the brightness value of the reproduction image data, the brightness value of the current frame is increased by a value corresponding to the amount of change having a positive value, and when the brightness value of the current frame is decreased to be lower than the brightness value of the reproduction image data, the brightness value of the current frame is decreased by a value corresponding to the amount of change having a negative value.

8. An image processing method for correcting image data indicative of a gradation value of each pixel of an image corresponding to a voltage applied to a liquid crystal in accordance with an amount of change in the gradation value of the each pixel and outputting the corrected image data, comprising the steps of:

quantizing image data of a current frame on a block-by-block basis to output encoded image data corresponding to the image of the current frame;

decoding the encoded image data to output first decoded image data corresponding to the image data of the current frame;

delaying the encoded image data by a period corresponding to one frame;

decoding the delayed encoded image data to output second decoded image data corresponding to image data of a frame preceding the current frame by one frame;

emphasizing high frequency components of the first decoded image data;

emphasizing high frequency components of the second decoded image data;

finding an amount of change in each pixel between the first decoded image data, high frequency components of which is emphasized, and the second decoded image data, high frequency components of which is emphasized;

calculating reproduction image data corresponding to the one-frame preceding image data with use of the amount of change and the image data of the current frame;

correcting the gradation value of the image data of the current frame in accordance with the image data of the current frame and the reproduction image data;

reducing number of pixels of the image data of each block in the image data of the current frame, wherein the number of pixels of the image data of the current frame in each block.

wherein reduction-number of pixels of the image data of the current frame in each block is adjusted in accordance with the dynamic range of the image data of the current frame in each block; and displaying, by utilizing a display, an image based on the dynamic range of the image data.

9. The image processing method according to claim 8, wherein the step of emphasizing high frequency components of the first decoded image data and the step of emphasizing high frequency components of the second decoded image data are carried out when the number of pixels of the image data is decreased.

10. The image processing method according to claim 8, wherein the step of correcting the gradation value is carried out so that, upon comparison between the image data of the current frame and the reproduction image data, when the brightness value of the current frame is increased to be higher than the brightness value of the reproduction image data, the brightness value of the current frame is increased by a value corresponding to the amount of change having a positive value, and when the brightness value of the current frame is decreased to be lower than the brightness value of the reproduction image data, the brightness value of the current frame is decreased by a value corresponding to the amount of change having a negative value.

* * * * *